(12) United States Patent
Choi et al.

(10) Patent No.: US 12,395,787 B2
(45) Date of Patent: *Aug. 19, 2025

(54) SOUND GENERATING APPARATUS

(71) Applicant: LG DISPLAY CO., LTD., Seoul (KR)

(72) Inventors: YeongRak Choi, Paju-si (KR); ChangHo Oh, Seoul (KR); KwanHo Park, Incheon (KR); Sungtae Lee, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 27 days.

This patent is subject to a terminal disclaimer.

(21) Appl. No.: 18/217,983

(22) Filed: Jul. 3, 2023

(65) Prior Publication Data
US 2023/0353934 A1 Nov. 2, 2023

Related U.S. Application Data

(63) Continuation of application No. 17/228,674, filed on Apr. 12, 2021, now Pat. No. 11,736,858, which is a
(Continued)

(30) Foreign Application Priority Data

Mar. 28, 2016 (KR) .......................... 10-2016-0037118

(51) Int. Cl.
*H04R 1/32* (2006.01)
*G02F 1/1333* (2006.01)
(Continued)

(52) U.S. Cl.
CPC ........... *H04R 1/323* (2013.01); *G02F 1/1333* (2013.01); *G06F 1/1605* (2013.01); *H04R 1/025* (2013.01);
(Continued)

(58) Field of Classification Search
CPC ........ H04R 1/323; H04R 1/025; H04R 7/045; H04R 9/02; H04R 1/028; H04R 5/02;
(Continued)

(56) References Cited

U.S. PATENT DOCUMENTS

| 4,675,907 A | 6/1987 | Itagaki et al. |
| 4,891,842 A | 1/1990 | Green |

(Continued)

FOREIGN PATENT DOCUMENTS

| CN | 1358400 A | 7/2002 |
| CN | 1500365 A | 5/2004 |

(Continued)

OTHER PUBLICATIONS

Non-final Office Action from the U.S. Patent and Trademark Office issued in U.S. Appl. No. 16/038,075 dated Jan. 18, 2019.
(Continued)

*Primary Examiner* — Md S Elahee
(74) *Attorney, Agent, or Firm* — Morgan, Lewis & Bockius LLP

(57) ABSTRACT

A panel vibration type sound generating display device is disclosed. The display device includes a display panel for displaying an image; a sound generating actuator connected to the display panel and configured to vibrate the display panel to generate sound; a support structure spaced apart from the display panel with an air gap between the support structure and the display panel; and a baffle part disposed between the support structure and the display panel to surround the air gap.

16 Claims, 34 Drawing Sheets

Related U.S. Application Data continuation of application No. 16/696,847, filed on Nov. 26, 2019, now Pat. No. 11,019,425, which is a continuation of application No. 15/987,267, filed on May 23, 2018, now Pat. No. 10,555,073, which is a continuation of application No. 15/374,566, filed on Dec. 9, 2016, now Pat. No. 10,009,683.

(51) Int. Cl.

| | | |
|---|---|---|
| *G06F 1/16* | (2006.01) | |
| *H04R 1/02* | (2006.01) | |
| *H04R 7/04* | (2006.01) | |
| *H04R 9/02* | (2006.01) | |
| G09G 3/3225 | (2016.01) | |
| G09G 3/3266 | (2016.01) | |
| G09G 3/3275 | (2016.01) | |
| H04R 5/02 | (2006.01) | |
| H04R 9/04 | (2006.01) | |
| H04R 9/06 | (2006.01) | |

(52) U.S. Cl.
CPC .............. *H04R 1/028* (2013.01); *H04R 7/045* (2013.01); *H04R 9/02* (2013.01); *G02F 1/133308* (2013.01); *G09G 3/3225* (2013.01); *G09G 3/3266* (2013.01); *G09G 3/3275* (2013.01); *G09G 2310/08* (2013.01); *H04R 5/02* (2013.01); *H04R 7/04* (2013.01); *H04R 9/043* (2013.01); *H04R 9/063* (2013.01); *H04R 2400/03* (2013.01); *H04R 2499/11* (2013.01); *H04R 2499/15* (2013.01)

(58) Field of Classification Search
CPC .............. G02F 1/1333; G02F 1/133308; G06F 1/1605; H01L 51/5253; G02B 6/0011
USPC ........................................................ 381/333
See application file for complete search history.

(56) References Cited

U.S. PATENT DOCUMENTS

| | | |
|---|---|---|
| 5,025,474 A | 6/1991 | Tanaka et al. |
| 5,535,028 A | 7/1996 | Bae et al. |
| 5,796,854 A | 8/1998 | Markow |
| 5,856,819 A | 1/1999 | Vossler |
| 6,137,890 A | 10/2000 | Markow |
| 6,208,237 B1 | 3/2001 | Saiki et al. |
| 6,238,755 B1 | 5/2001 | Harvey et al. |
| 6,342,831 B1 | 1/2002 | Azima |
| 6,443,586 B1 | 9/2002 | Azima et al. |
| 6,610,237 B2 | 8/2003 | Azima et al. |
| 6,618,487 B1 | 9/2003 | Azima et al. |
| 6,677,384 B1 | 1/2004 | Ikemoto et al. |
| 6,751,329 B2 | 6/2004 | Colloms et al. |
| 6,795,561 B1 | 9/2004 | Bank |
| 6,819,309 B1 | 11/2004 | Kishi |
| 6,826,285 B2 | 11/2004 | Azima |
| 6,871,149 B2 | 3/2005 | Sullivan et al. |
| 6,911,901 B2 | 6/2005 | Bown |
| 6,922,642 B2 | 7/2005 | Sullivan |
| 6,937,124 B1 | 8/2005 | Nakamura et al. |
| 6,956,957 B1 | 10/2005 | Azima et al. |
| 6,985,596 B2 | 1/2006 | Bank et al. |
| 7,020,302 B2 | 3/2006 | Konishi et al. |
| 7,050,600 B2 | 5/2006 | Saiki et al. |
| 7,120,264 B2 | 10/2006 | Saiki et al. |
| 7,157,649 B2 | 1/2007 | Hill |
| 7,158,651 B2 | 1/2007 | Bachmann et al. |
| 7,174,025 B2 | 2/2007 | Azima et al. |
| 7,184,898 B2 | 2/2007 | Sullivan et al. |
| 7,215,329 B2 | 5/2007 | Yoshikawa et al. |
| 7,305,248 B2 | 12/2007 | Mori |
| 7,372,110 B2 | 5/2008 | Hatano |
| 7,376,523 B2 | 5/2008 | Sullivan et al. |
| 7,382,890 B2 | 6/2008 | Saiki et al. |
| 7,446,826 B2 | 11/2008 | Ro et al. |
| 7,536,211 B2 | 5/2009 | Saiki et al. |
| 7,545,459 B2 | 6/2009 | Fujiwara et al. |
| 7,564,984 B2 | 7/2009 | Bank et al. |
| 7,570,771 B2 | 8/2009 | Whitewell et al. |
| 7,593,159 B2 | 9/2009 | Yokoyama et al. |
| 7,657,042 B2 | 2/2010 | Miyata |
| 7,664,278 B2 | 2/2010 | Watanabe et al. |
| 7,764,803 B2 | 7/2010 | Kang |
| 7,769,191 B2 | 8/2010 | Lee et al. |
| 7,800,702 B2 | 9/2010 | Tsuboi et al. |
| 7,843,136 B2 | 11/2010 | Ishii et al. |
| 7,903,091 B2 | 3/2011 | Lee et al. |
| 8,174,495 B2 | 5/2012 | Takashima et al. |
| 8,174,511 B2 | 5/2012 | Takenaka et al. |
| 8,180,074 B2 | 5/2012 | Ko et al. |
| 8,194,894 B2 | 6/2012 | Burton et al. |
| 8,274,480 B2 | 9/2012 | Sullivan |
| 8,736,558 B2 | 5/2014 | East et al. |
| 8,816,977 B2 | 8/2014 | Rothkopf et al. |
| 8,830,211 B2 | 9/2014 | Hill |
| 8,879,766 B1 | 11/2014 | Zhang |
| 8,917,168 B2 | 12/2014 | Kono et al. |
| 8,934,228 B2 | 1/2015 | Franklin et al. |
| 9,001,060 B2 | 4/2015 | Harris |
| 9,030,447 B2 | 5/2015 | Hsu |
| 9,035,918 B2 | 5/2015 | Harris et al. |
| 9,041,662 B2 | 5/2015 | Harris |
| 9,046,949 B2 | 6/2015 | Adachi et al. |
| 9,063,256 B2 | 6/2015 | Liao |
| 9,107,006 B2 | 8/2015 | Wang et al. |
| 9,122,011 B2 | 9/2015 | Oh et al. |
| 9,131,301 B2 | 9/2015 | Tsai et al. |
| 9,137,592 B2 | 9/2015 | Yliaho et al. |
| 9,148,716 B2 | 9/2015 | Liu et al. |
| 9,173,014 B2 | 10/2015 | Park |
| 9,191,749 B2 | 11/2015 | Nabata et al. |
| 9,197,966 B2 | 11/2015 | Umehara et al. |
| 9,204,223 B2 | 12/2015 | Nabata et al. |
| 9,285,882 B2 | 3/2016 | Wang et al. |
| 9,288,564 B2 | 3/2016 | Faerstain et al. |
| 9,300,770 B2 | 3/2016 | Nabata et al. |
| 9,317,063 B2 | 4/2016 | Kwon et al. |
| 9,332,098 B2 | 5/2016 | Horii |
| 9,350,832 B2 | 5/2016 | Horii |
| 9,357,280 B2 | 5/2016 | Mellow et al. |
| 9,363,591 B2 | 6/2016 | Ozasa et al. |
| 9,363,607 B2 | 6/2016 | Ando |
| 9,380,366 B2 | 6/2016 | Kang et al. |
| 9,389,688 B2 | 7/2016 | Tossavainen et al. |
| 9,398,358 B2 | 7/2016 | Louh |
| 9,436,320 B2 | 9/2016 | Kang et al. |
| 9,544,671 B2 | 1/2017 | Shi et al. |
| 9,575,240 B2 | 2/2017 | Akanuma et al. |
| 9,609,438 B2 | 3/2017 | Kim et al. |
| 9,654,863 B2 | 5/2017 | Crosby et al. |
| 9,818,805 B2 | 11/2017 | Choi et al. |
| 9,868,137 B2 | 1/2018 | Kiyose et al. |
| 10,009,683 B2 | 6/2018 | Choi et al. |
| 10,129,646 B2 | 11/2018 | Choi et al. |
| 10,142,738 B2 | 11/2018 | Choi et al. |
| 10,142,739 B2 | 11/2018 | Choi et al. |
| 10,200,772 B2 * | 2/2019 | Ahn .................. H04R 1/028 |
| 10,219,079 B2 | 2/2019 | Choi et al. |
| 10,237,656 B2 | 3/2019 | Lee et al. |
| 10,409,325 B2 | 9/2019 | Choi et al. |
| 10,412,500 B2 | 9/2019 | Lee et al. |
| 10,555,073 B2 | 2/2020 | Choi et al. |
| 11,019,425 B2 | 5/2021 | Choi et al. |
| 2001/0040976 A1 | 11/2001 | Buos |
| 2001/0043714 A1 | 11/2001 | Asada et al. |
| 2002/0018574 A1 | 2/2002 | Okuno et al. |
| 2002/0061115 A1 | 5/2002 | Chung et al. |
| 2002/0064290 A1 | 5/2002 | Reynaga et al. |
| 2002/0118856 A1 | 8/2002 | Croft et al. |
| 2002/0141607 A1 | 10/2002 | Azima et al. |
| 2003/0227581 A1 | 12/2003 | Sung et al. |

(56) References Cited

U.S. PATENT DOCUMENTS

| | | |
|---|---|---|
| 2003/0233794 A1 | 12/2003 | Pylkki et al. |
| 2004/0008859 A1 | 1/2004 | Zhao |
| 2004/0184622 A1 | 9/2004 | Ohashi |
| 2005/0129258 A1 | 6/2005 | Fincham |
| 2005/0129265 A1 | 6/2005 | Nakajima et al. |
| 2006/0010403 A1 | 1/2006 | Jeon |
| 2006/0018503 A1 | 1/2006 | Endo |
| 2006/0078153 A1 | 4/2006 | Sato |
| 2006/0120542 A1 | 6/2006 | Lee |
| 2006/0126885 A1 | 6/2006 | Combest |
| 2006/0140437 A1 | 6/2006 | Watanabe et al. |
| 2006/0140439 A1 | 6/2006 | Nakagawa |
| 2006/0187140 A1 | 8/2006 | Brask |
| 2006/0245155 A1 | 11/2006 | Konno et al. |
| 2006/0290838 A1 | 12/2006 | Ro et al. |
| 2007/0019134 A1 | 1/2007 | Park et al. |
| 2007/0036388 A1 | 2/2007 | Lee et al. |
| 2007/0132911 A1 | 6/2007 | Fujiwara et al. |
| 2007/0187172 A1 | 8/2007 | Kaneda et al. |
| 2007/0206822 A1 | 9/2007 | Whitewell et al. |
| 2007/0290609 A1 | 12/2007 | Ishii et al. |
| 2008/0085019 A1 | 4/2008 | Wagenaars et al. |
| 2009/0021898 A1 | 1/2009 | Konno et al. |
| 2009/0034174 A1 | 2/2009 | Ko et al. |
| 2009/0034759 A1 | 2/2009 | Ko et al. |
| 2009/0097692 A1 | 4/2009 | Sakamoto |
| 2009/0141926 A1 | 6/2009 | Clair et al. |
| 2009/0247237 A1 | 10/2009 | Mittleman et al. |
| 2009/0267891 A1 | 10/2009 | Ali |
| 2011/0248935 A1 | 10/2011 | Mellow et al. |
| 2012/0034541 A1 | 2/2012 | Muraoka et al. |
| 2012/0082317 A1 | 4/2012 | Pance et al. |
| 2012/0162143 A1 | 6/2012 | Kai et al. |
| 2012/0242592 A1 | 9/2012 | Rothkopf et al. |
| 2012/0243719 A1 | 9/2012 | Franklin et al. |
| 2012/0274570 A1 | 11/2012 | Kim |
| 2013/0064401 A1 | 3/2013 | Wang et al. |
| 2013/0077810 A1 | 3/2013 | Mellow et al. |
| 2013/0089231 A1 | 4/2013 | Wilk et al. |
| 2013/0106868 A1 | 5/2013 | Shenoy |
| 2013/0250169 A1 | 9/2013 | Kim |
| 2013/0250536 A1 | 9/2013 | Satake |
| 2013/0335892 A1 | 12/2013 | Ha et al. |
| 2013/0343564 A1 | 12/2013 | Darlington |
| 2014/0029777 A1 | 1/2014 | Jang |
| 2014/0049522 A1 | 2/2014 | Mathew et al. |
| 2014/0145836 A1 | 5/2014 | Tossavainen et al. |
| 2014/0146093 A1 | 5/2014 | Sako et al. |
| 2014/0197380 A1 | 7/2014 | Sung et al. |
| 2014/0241558 A1 | 8/2014 | Yliaho et al. |
| 2014/0241564 A1 | 8/2014 | Kang et al. |
| 2014/0296715 A1 | 10/2014 | Kiyose et al. |
| 2014/0326402 A1 | 11/2014 | Lee et al. |
| 2014/0334078 A1 | 11/2014 | Lee et al. |
| 2015/0003659 A1 | 1/2015 | Theuss |
| 2015/0010187 A1 | 1/2015 | Lee et al. |
| 2015/0016658 A1 | 1/2015 | Lee |
| 2015/0062101 A1 | 3/2015 | Kim et al. |
| 2015/0078604 A1 | 3/2015 | Seo et al. |
| 2015/0119834 A1 | 4/2015 | Locke et al. |
| 2015/0138157 A1 | 5/2015 | Harris et al. |
| 2015/0195630 A1 | 7/2015 | Yliaho et al. |
| 2015/0341714 A1 | 11/2015 | Ahn et al. |
| 2015/0350775 A1 | 12/2015 | Behles et al. |
| 2016/0011442 A1 | 1/2016 | Lee et al. |
| 2016/0050472 A1 | 2/2016 | Lee et al. |
| 2016/0165327 A1 | 6/2016 | Crosby et al. |
| 2016/0212513 A1 | 7/2016 | Honda et al. |
| 2016/0261966 A1 | 9/2016 | Won |
| 2016/0345102 A1 | 11/2016 | Tagami et al. |
| 2017/0070811 A1 | 3/2017 | Mihelich et al. |
| 2017/0194224 A1 | 7/2017 | Yang et al. |
| 2017/0263886 A1 | 9/2017 | Oh et al. |
| 2017/0280216 A1 | 9/2017 | Lee et al. |
| 2018/0053813 A1 | 2/2018 | Choi et al. |
| 2018/0343522 A1 | 11/2018 | Choi et al. |
| 2019/0052963 A1 | 2/2019 | Choi et al. |
| 2019/0215607 A1 | 7/2019 | Lee et al. |

FOREIGN PATENT DOCUMENTS

| | | |
|---|---|---|
| CN | 1547416 A | 11/2004 |
| CN | 2733799 Y | 10/2005 |
| CN | 1717118 A | 1/2006 |
| CN | 1755449 A | 4/2006 |
| CN | 1780494 A | 5/2006 |
| CN | 1790139 A | 6/2006 |
| CN | 1812629 A | 8/2006 |
| CN | 1856178 A | 11/2006 |
| CN | 1892331 A | 1/2007 |
| CN | 1930910 A | 3/2007 |
| CN | 1980485 A | 6/2007 |
| CN | 101040561 A | 9/2007 |
| CN | 101093852 A | 12/2007 |
| CN | 101233785 A | 7/2008 |
| CN | 101766023 A | 6/2010 |
| CN | 201663651 U | 12/2010 |
| CN | 102483665 A | 5/2012 |
| CN | 102547496 A | 7/2012 |
| CN | 202652283 U | 1/2013 |
| CN | 202663535 U | 1/2013 |
| CN | 102917288 A | 2/2013 |
| CN | 102946577 A | 2/2013 |
| CN | 103067798 A | 4/2013 |
| CN | 103190082 A | 7/2013 |
| CN | 103278978 A | 9/2013 |
| CN | 203181212 U | 9/2013 |
| CN | 103416075 A | 11/2013 |
| CN | 103489377 A | 1/2014 |
| CN | 103698932 A | 4/2014 |
| CN | 104062075 A | 9/2014 |
| CN | 104068894 A | 10/2014 |
| CN | 104254047 A | 12/2014 |
| CN | 105096778 A | 11/2015 |
| CN | 204929153 U | 12/2015 |
| CN | 105225608 A | 1/2016 |
| CN | 206993387 U | 2/2016 |
| CN | 105933834 A | 9/2016 |
| CN | 107561753 A | 1/2018 |
| DE | 102014112962 A1 | 3/2016 |
| EP | 1 507 438 A2 | 2/2005 |
| EP | 1881731 A1 | 1/2008 |
| EP | 2947857 A2 | 11/2015 |
| JP | 55-25284 A | 2/1980 |
| JP | H02-001987 A | 1/1990 |
| JP | H03-132296 A | 6/1991 |
| JP | 2696801 B2 | 1/1998 |
| JP | H11-44891 A | 2/1999 |
| JP | 2000-138995 A | 5/2000 |
| JP | 2001-61194 A | 3/2001 |
| JP | 2002-511681 A | 4/2002 |
| JP | 2002-264646 A | 9/2002 |
| JP | 2003-211087 A | 7/2003 |
| JP | 3578244 B2 | 10/2004 |
| JP | 2004-343362 A | 12/2004 |
| JP | 2005-175553 A | 6/2005 |
| JP | 2005-244804 A | 9/2005 |
| JP | 2006-138149 A | 6/2006 |
| JP | 2006-186590 A | 7/2006 |
| JP | 2006-279284 A | 10/2006 |
| JP | 2006-319626 A | 11/2006 |
| JP | 2006-325079 A | 11/2006 |
| JP | 3896675 B2 | 3/2007 |
| JP | 2007-267302 A | 10/2007 |
| JP | 2007-528648 A | 10/2007 |
| JP | 2007-300578 A | 11/2007 |
| JP | 4150643 B2 | 9/2008 |
| JP | 2009-100223 A | 5/2009 |
| JP | 2009214060 A | 9/2009 |
| JP | 2009-302924 A | 12/2009 |
| JP | 2010-027845 A | 2/2010 |
| JP | 2010-081142 A | 4/2010 |
| JP | 4449605 B2 | 4/2010 |
| JP | 2011-053744 A | 3/2011 |

(56) References Cited

FOREIGN PATENT DOCUMENTS

| | | |
|---|---|---|
| JP | 2011-123696 A | 6/2011 |
| JP | 2012-129247 A | 7/2012 |
| JP | 2012-198407 A | 10/2012 |
| JP | 5060443 B2 | 10/2012 |
| JP | 2013-044912 A | 3/2013 |
| JP | 2013-102360 A | 5/2013 |
| JP | 2014-509028 A | 4/2014 |
| JP | 2014-220237 A | 11/2014 |
| JP | 2014-220802 A | 11/2014 |
| JP | 2015-219528 A | 12/2015 |
| KR | 10-2008-0002228 A | 1/2008 |
| KR | 2008-0063698 A | 7/2008 |
| KR | 10-2009-0019176 A | 2/2009 |
| KR | 10-1026987 B1 | 4/2011 |
| KR | 10-1061519 B1 | 9/2011 |
| KR | 10-1404119 B1 | 6/2014 |
| KR | 101410393 B2 | 6/2014 |
| KR | 2015-0005089 A | 1/2015 |
| KR | 10-2015-0031641 A | 3/2015 |
| KR | 10-1499514 B1 | 3/2015 |
| KR | 10-2015-0131428 A | 11/2015 |
| KR | 2015-133918 A | 12/2015 |
| KR | 10-2017-0135673 A | 12/2017 |
| TW | 200706049 A | 2/2007 |
| TW | M451766 U | 4/2013 |
| TW | 201319783 A | 5/2013 |
| TW | 201503710 A | 1/2015 |
| TW | 201545559 A | 12/2015 |
| WO | 99/52322 A1 | 10/1999 |
| WO | 2005-089014 A1 | 9/2005 |
| WO | 2009-017280 A1 | 2/2009 |
| WO | 2012/050771 A1 | 4/2012 |
| WO | 2012090031 A1 | 7/2012 |
| WO | 2012/129247 A2 | 9/2012 |
| WO | 2013/109128 A2 | 7/2013 |
| WO | 2014021608 A1 | 2/2014 |
| WO | 2015-046288 A1 | 4/2015 |
| WO | 2016/002230 A1 | 1/2016 |

OTHER PUBLICATIONS

Office Action issued in Japanese Patent Application No. 2017-131154 dated Dec. 11, 2018.
Office Action dated May 31, 2017, from the Taiwanese Patent Office in related Application No. 106121605.
Taiwanese Office Action dated May 15, 2018, issued in Taiwanese Application No. 106122586.
Japanese Office Action dated Jul. 3, 2018, issued in Japanese Application No. 2016-235794.
Japanese Office Action dated Jun. 5, 2018, issued in Japanese Application No. 2017-131154.
Notice of Allowance dated Jul. 5, 2021, issued in the Chinese Patent Application No. 202010363294.X.
Office Action dated Mar. 27, 2017 from the Korean Patent Office in related Application No. 10-2016-0146951 dated Jan. 3, 2018.
Japanese Office Action dated Aug. 23, 2018, issued in Japanese Application No. 2017-137757.
Japanese Office Action dated Aug. 23, 2018, issued in Japanese Application No. 2017-124022.
Japanese Office Action dated Sep. 25, 2018, issued in Japanese Application No. 2017-131143.
Communication dated Jun. 30, 2017 from the European Patent Office in related European application No. 16181195.5.
Office Action issued in Chinese Patent Application No. 201710599021.3 dated Mar. 20, 2019.
Office Action issued in Japanese Patent Application No. 2017-124022 dated Apr. 9, 2019.
Office Action dated Nov. 19, 2020, from the Chinese Patent Office in counterpart Chinese Application No. 202010363413.1.
Office Action dated Nov. 19, 2020, from the Chinese Patent Office in counterpart Chinese Application No. 202010368984.4.
Office Action dated Dec. 1, 2020, from the Chinese Patent Office in counterpart Chinese Application No. 202010363294.X.
Office Action dated Jan. 6, 2021, from the Chinese Patent Office in counterpart Chinese Application No. 202010364802.6.
Notice of Allowance dated Jul. 5, 2021 issued by the China National Intellectual Property Administration in the counterpart Chinese Application No. 202010363294.X.
Shim, Samsung claims double sided LCD, EDN, Jan. 2007.
Notice of Allowance dated Mar. 24, 2021, issued in the Chinese Patent Application No. 202010363413.1.
Chinese Office Action dated Jun. 5, 2019, issued in Chinese Application No. 201610823135.7.
Extended European Search Report issued in European Application No. 17183078.9 dated Jan. 16, 2018.
Extended European Search Report issued in European Application No. 17184428.5 dated Jan. 23, 2018.
Extended European Search Report issued in European Application No. 17184429.3 dated Jan. 26, 2018.
Japanese Office Action issued in Japanese Application No. 2016-216426 dated Nov. 24, 2017.
Taiwanese Office Action issued in Taiwanese Application No. 10720014270 dated Jan. 10, 2018.
Taiwanese Office Action issued in Taiwanese Application No. 10621325350 dated Jan. 3, 2018.
Office Action dated Sep. 26, 2017 from the Japanese Patent Office in related Japanese application No. 2016-190615.
Office Action dated Oct. 3, 2017 from the Japanese Patent Office in related Japanese application No. 2016-235794.
Communication dated Sep. 19, 2017 from the European Patent Office in related European application No. 16181185.6.
Communication dated Sep. 5, 2017 from the European Patent Office in related European application No. 16181191.4.
Hermida, Alfred, "PC Screen Turns Into Speaker," BBC News, Technology, Mar. 31, 2003, pp. 1-2.
USPTO Office Action dated Oct. 26, 2017 in related U.S. Appl. No. 15/471,458.
USPTO Office Action dated Nov. 9, 2017 in related U.S. Appl. No. 15/471,173.
USPTO Office Action dated Aug. 10, 2017 in related U.S. Appl. No. 15/340,709.
USPTO Office Action dated Oct. 13, 2017 in related U.S. Appl. No. 15/471,184.

* cited by examiner

SOUND GENERATING APPARATUS

CROSS REFERENCE TO RELATED APPLICATIONS

This application is a continuation of co-pending U.S. patent application Ser. No. 17/228,674, filed Apr. 12, 2021, which is a continuation of U.S. patent application Ser. No. 16/696,847, filed Nov. 26, 2019, now U.S. Pat. No. 11,019,425, issued May 25, 2021, which is a continuation of U.S. patent application Ser. No. 15/987,267, filed May 23, 2018, now U.S. Pat. No. 10,555,073, issued Feb. 4, 2020, which is a continuation of U.S. patent application Ser. No. 15/374,566, filed Dec. 9, 2016, now U.S. Pat. No. 10,009,683, issued Jun. 26, 2018, which claims priority from Korean Patent Application No. 10-2016-0037118, filed on Mar. 28, 2016. Each of the above prior U.S. and Korean Patent Applications is hereby incorporated by reference for all purposes as if fully set forth herein.

1. FIELD OF THE INVENTION

The present disclosure relates to a display device and, more specifically, to a display device for generating sound by directly vibrating a display panel thereof.

2. DESCRIPTION OF THE PRIOR ART

With the development of various portable electronic devices, such as mobile communication terminals and notebook computers, there has been an increase in the requirement for a flat panel display device applicable thereto.

The flat panel display devices being researched include a Liquid Crystal Display Device, a Plasma Display Panel, a Field Emission Display Device, a Light Emitting Diode Display Device, and an Organic Light Emitting Diode Display Device.

Among these display devices, the Liquid Crystal Display (LCD) device includes: an array substrate including a thin film transistor; an upper substrate including a color filter and/or a black matrix; and a liquid crystal material layer formed therebetween, wherein an alignment state of the liquid crystal layer is controlled according to an electric field applied between opposite electrodes of a pixel area, and thereby the transmittance of light is adjusted to display an image.

In a display panel of such a liquid crystal display device, an Active Area (AA) configured to provide an image to a user and a Non-active Area (NA), which is a peripheral area of the Active Area (AA), are defined. The display panel is usually manufactured by attaching a first substrate, which is an array substrate having a thin film transistor formed therein to define a pixel area, and a second substrate, which is an upper substrate having a black matrix and/or color filter layer formed thereon, to each other.

The array substrate or first substrate, on which a thin film transistor is formed, includes a plurality of gate lines GS extending in a first direction and a plurality of data lines DL extending in a second direction perpendicular to the first direction, and one pixel area P is defined by each gate line and each data line. One or more thin film transistors are formed in one pixel area P, and gate and source electrodes of each thin film transistor may be connected to a gate line and a data line, respectively.

Among these display devices, the liquid crystal display device does not have its own light-emitting element and thus needs a separate light source. Therefore, the liquid crystal display device has a back-light unit having a light source, such as an LED, which is arranged at the rear surface thereof and irradiates a light toward a front surface of the liquid crystal panel thereof, thereby at last implementing a recognizable image.

Meanwhile, an Organic Light Emitting Diode (OLED) display device, which has recently been in the spotlight as a display device has a fast response rate, a high light emitting efficiency, a high luminance and a wide viewing angle compared to other conventional devices, because an OLED emits light by itself, i.e., an additional backlight unit is not required.

In the organic light emitting diode display device, sub-pixels including organic light emitting diodes are arranged in a matrix form, and the brightness of the sub-pixels selected by a scan signal is controlled according to a gray scale of the data. Further, the organic light emitting diode display device, which is an emissive element, consumes a smaller amount of power and has a high response speed, a high light emitting efficiency, a high luminance, and a wide viewing angle.

Meanwhile, the above-described display device may be included in a set apparatus or finished produce, such as a television (TV), a computer monitor, or an advertising panel.

Such a display device or set apparatus includes a sound output device, such as a speaker, for generating and outputting sound relating to an image.

Conventionally, a company that manufactures a display device, such as a liquid crystal display device or an organic light emitting diode display device, manufactures only a display panel or display device, while another company that manufactures a sound output device assembles the sound output device, such as a speaker, with the manufactured display device, so as to finally complete a set apparatus capable of outputting both an image and sound.

FIG. 1 is a schematic plan view of a speaker included in a conventional display device.

As shown in FIG. 1, the conventional display device 1 includes a speaker 2 disposed at a rear or lower part of a display panel thereof.

In this structure, the sound generated by the speaker 2 does not progress toward a viewer, who is viewing an image from the front side of the display device 1, but progresses toward the rear side or the underside of the display panel. Therefore, the sound may disturb the viewer's immersive experience.

Further, when the sound generated from the speaker 2 progresses toward the rear side or underside of the display panel, the sound quality may be degraded due to an interference with sound reflected by a wall or floor.

Also, the sound generated by a speaker included in conventional display devices is not oriented toward a viewer of the display device and may thus undergo diffraction, which decreases sound localization. Moreover, in configuring a set apparatus, such as a TV, a speaker may occupy a predetermined space, which imposes a restriction on the design and spatial arrangement of the set apparatus.

Therefore, there has been an increasing interested in the development of technology which can improve the quality of sound output from a display device and prevent the viewer's immersive experience from being disturbed.

SUMMARY OF THE INVENTION

The present disclosure has been made to overcome the above-mentioned problems of the prior art and, in one aspect, provide a panel vibration type sound generating display device, which can generate sound by directly vibrating a display panel of the display device.

In another aspect, the present disclosure provides a display device including a panel vibration type sound generating apparatus, which has a predetermined air gap formed between a display panel and a sound generating actuator and an actuator support hole formed in a support structure of the display device, so that the display device has a reduced thickness while having an excellent sound generation performance. The support structure may also be termed a support member or support part.

In another aspect, the present disclosure provides a display device having a sound generation baffle part formed therein, which includes an adhesive member attached between the upper surface of the support structure and the lower surface of the display panel and a sealing part disposed outside the adhesive member, so that the display device can minimize sound leakage and improve a sound output characteristic. The adhesive member may be a double-sided tape.

In another aspect, the present disclosure provides a display device, which includes one or more buffer members arranged between the inner surface of the support structure and the rear surface of the display panel adjacent to a source printed circuit board (PCB) or between the support structure disposed at the rear surface of the display panel and the source PCB to fix/support the sound generating actuator, to prevent interference and noise between the support structure and a Source PCB (S-PCB) for driving the display panel.

The panel vibration type sound generating display device may further comprise a set PCB, which is disposed at an outer rear surface of the cover bottom and includes a control circuit configured to control the entire display device, wherein a cable passing hole through which a connection cable for electrically connecting the source PCB and the set PCB is to pass is disposed at an area of the cover bottom corresponding to the first area.

In another aspect, the present disclosure provides a display device in which a sound generating actuator is placed at a first position of a support structure of the display device and a set PCB of a set apparatus is placed at a second position, which is different from the first position, so as to avoid interference between the sound generating actuator and the set PCB, and improve the sound characteristic.

In still another aspect, the present disclosure provides a display device, which has a reinforcement member arranged inside the support structure of the display device when two or more sound generating actuators are used, so that the display device can prevent deformation of the support structure due to different vibration characteristics of the two or more sound generating actuators or prevent sound distortion by the vibration of the support structure.

In view of the above aspects, a display device of the present embodiment includes: a display panel configured to display an image; and a sound generating actuator connected to a surface of the display panel configured to vibrate the display panel to generate sound. The surface may be an inner surface, for example.

The display device may further include a support structure, such as a cover bottom, configured to cover and support at least a rear surface of the display panel, wherein the sound generating actuator is inserted in and fixed to a support hole formed at the cover bottom to be fixed to the support structure.

The support structure of the panel vibration type sound generating display device may comprise: a cover bottom supporting the rear side of the display panel, a source PCB for driving the display panel is disposed on a rear surface of one side of the display panel, and a first buffer member spaced from the source PCB by a predetermined distance is placed on an inner surface of the cover bottom corresponding to the source PCB.

The sound generating actuator may further include: a plate inserted in the support hole; a magnet disposed on the plate; a center pole disposed at a center of the plate; a bobbin disposed to surround the center pole and be in contact with the display panel; and a coil wound around the bobbin. The plate may be a lower plate, for example.

The lower plate configuring the sound generating actuator may further include an extension part extending outward, and the extension part may be fixed to the lower surface of the cover bottom through a bolt, a PEM™ nut, or an adhesive member.

The extension part and the cover bottom of the panel vibration type sound generating display device, may be fixedly coupled to each other by one of a bolt fastened through a through-hole provided through the extension part to a screw hole disposed at the cover bottom and an adhesive member disposed between the extension part and the cover bottom.

The panel vibration type sound generating display device may further comprise a baffle part disposed between the support structure and the lower surface of the display panel to define an air gap, which is a space in which the display panel can be vibrated by the sound generating actuator.

An air gap is formed between the display panel and the support member, and the display device may further include a baffle part including an adhesive member and a sealing part arranged between the lower surface of the display panel and the upper surface of the support member at an edge of the air gap.

The baffle part of the panel vibration type sound generating display device may comprise an adhesive member disposed at an edge of the air gap and attached to the lower surface of the display panel and the upper surface of the support structure, and a sealing part disposed outside the adhesive member.

The sealing part of the panel vibration type sound generating display device may have a thickness larger than the thickness of the adhesive member.

The support member includes a cover bottom supporting a rear side of the display panel and a middle cabinet supporting the edge of the display panel. The middle cabinet may include an area division member configured to separate a first area including a source PCB and a second area including a sound generating actuator.

The support structure of the panel vibration type sound generating display device may comprise a cover bottom, which supports a rear side of the display panel, and a middle cabinet, which has a shape of a frame, coupled to the cover bottom to support a side surface of the display panel, and stably holds the edge of the display panel, the middle cabinet comprising an area division member configured to separate a first area including a source PCB for driving the display panel and a second area including the sound generating actuator.

The baffle part of the panel vibration type sound generating display device may comprise an adhesive member attached to three sides of the middle cabinet corresponding to the second area, an upper surface of the area division member, and the lower surface of the display panel, and a sealing part disposed outside the adhesive member.

A recessed part is formed on an upper surface of the cover bottom opposite to the source PCB placed on a rear surface of the display panel, and a first buffer member spaced a predetermined distance from the lower surface of the display panel may be disposed on the recessed part. The recessed part may be concave, for example.

The cover bottom may have a second buffer member disposed thereon, which is in contact with the lower surface of the display panel and the upper surfaces of the cover bottom while separating a first area covering the source PCB and a second area covering the sound generating actuator.

The sound generating actuator may include two or more actuators, which are symmetrically arranged and have different vibration characteristics, and the cover bottom may further have a reinforcement member disposed thereon, which passes through adjacent positions of the two or more actuators.

An embodiment of the present disclosure as described above provides a display device including a panel vibration type sound generating display device, which generates sound by directly vibrating a display panel, thereby making it unnecessary to install a separate speaker to the display device or a set apparatus including the display device.

Further, since the progressing direction of the sound coincides with the image output direction in the display device, the display device or the set apparatus can improve sound localization or sound output characteristics, the mechanism of the set apparatus can be easily designed, and can have a reduced thickness thereof.

A concave part of the panel vibration type sound generating display device may be disposed on the inner surface of the cover bottom corresponding to the source PCB and the first buffer member may be disposed on an upper surface of the concave part.

The cover bottom of the panel vibration type sound generating display device may have a second buffer member disposed thereon, which is in contact with the lower surface of the display panel and the upper surfaces of the cover bottom while separating a first area covering the source PCB and a second area covering the sound generating actuator.

The support structure of the panel vibration type sound generating display device may comprise a cover bottom supporting the rear side of the display panel. The display device may further comprise a set PCB, which is disposed at an outer rear surface of the cover bottom and includes a control circuit configured to control the entire display device, and a first position in which the sound generating actuator is disposed and a second position in which one or more boards configuring the set PCB are arranged do not overlap each other.

The support structure of the panel vibration type sound generating display device may comprise a cover bottom supporting the rear side of the display panel, the sound generating actuator may comprise two or more actuators, which are symmetrically arranged and have different vibration characteristics, the cover bottom may have a reinforcement member disposed thereon, which passes through adjacent positions of the two or more actuators.

The two or more actuators of the panel vibration type sound generating display device may comprise two left sound generating actuators and two right sound generating actuators, and the reinforcement member may be disposed to pass through a middle point of a segment connecting the two left sound generating actuators and a middle point of a segment connecting the two right sound generating actuators.

The panel vibration type sound generating display device may further comprise a sound compensation member, which is lengthily disposed at a position spaced a certain distance apart from an edge of the display panel opposite to a moving direction of the sound generating actuator when the sound generating actuator moves to a destination position spaced a predetermined distance apart from an initial position.

BRIEF DESCRIPTION OF THE DRAWINGS

The above and other objects, features and advantages of the present invention will be more apparent from the following detailed description taken in conjunction with the accompanying drawings, in which:

FIGS. 2A and 2B are schematic views of a panel vibration type sound generating apparatus according to an embodiment of the present disclosure wherein FIG. 2A is a plan view and FIG. 2B is a sectional view;

DETAILED DESCRIPTION OF THE EXEMPLARY EMBODIMENTS

Figure 1:
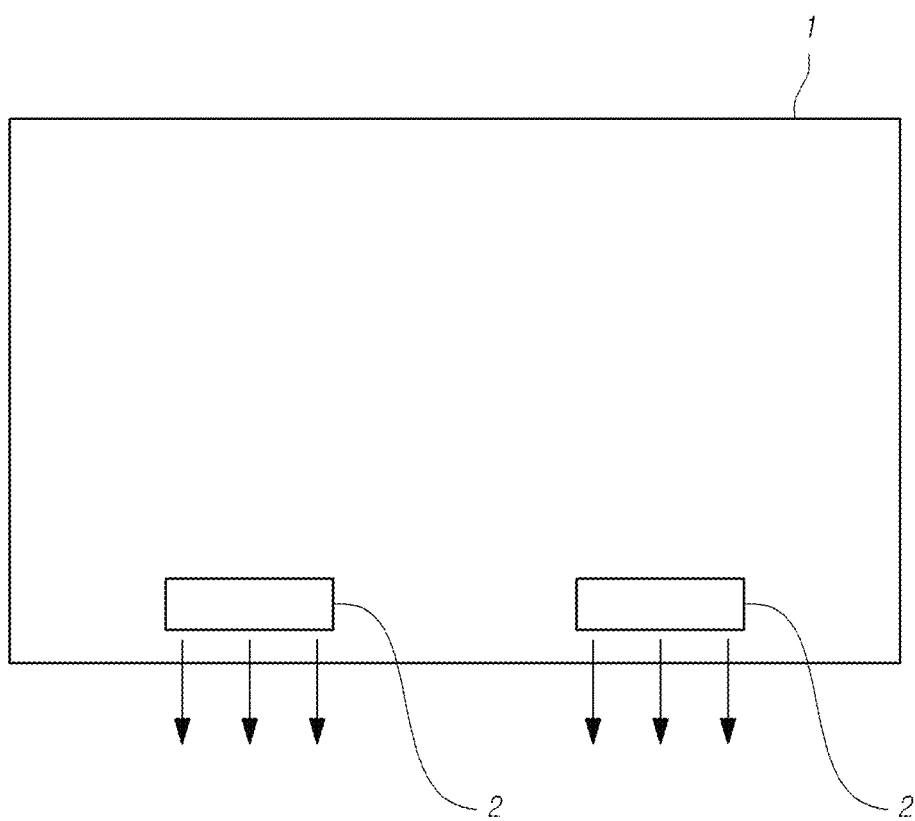
FIG. 1 is a schematic plan view of a speaker included in a conventional display device.

Hereinafter, embodiments of the present disclosure will be described with reference to the accompanying drawings. In assigning reference numerals to elements in the drawings, the same elements will be designated by the same reference numerals as far as possible although they are illustrated in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein in describing elements of the present invention. Each of these terminologies is not used to define an essence, order or sequence of a corresponding component but used merely to distinguish the corresponding component from other component(s). In the case that it is described that a certain element "is connected to", "is coupled to", or "is connected with" another element, it should be understood that not only can the certain element be directly connected or coupled to the another element, but an additional element may also be "interposed" between the elements or the elements may be connected or coupled to each other through an additional element.

Figure 2A:
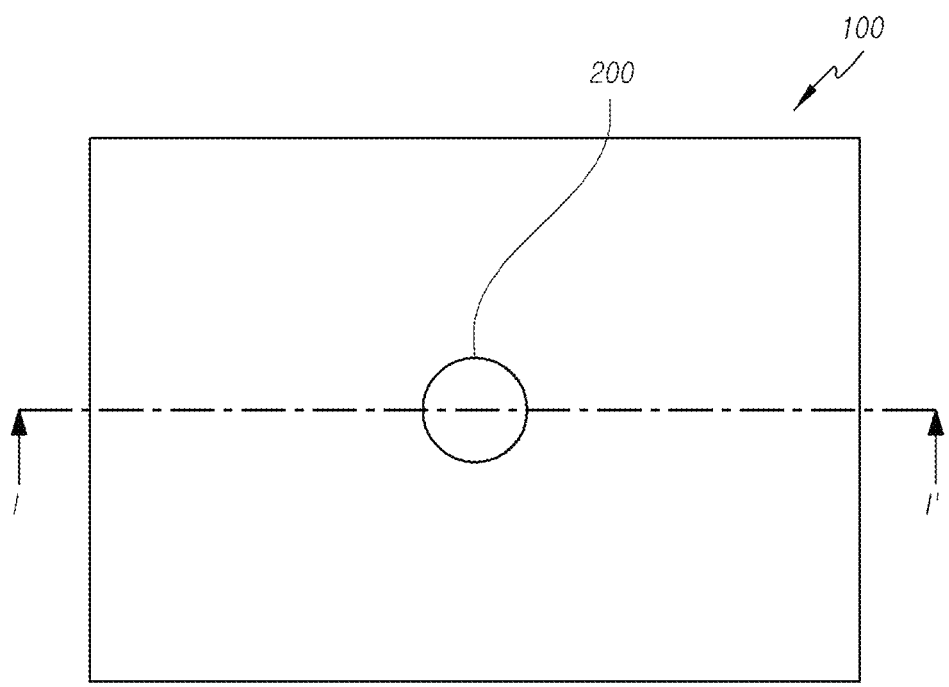
Figure 2B:
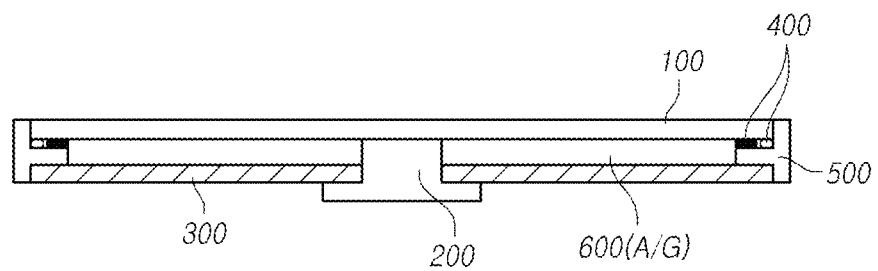

FIGS. 2A and 2B are schematic views of a panel vibration type sound generating apparatus according to an embodiment of the present disclosure, wherein FIG. 2A is a plan view and FIG. 2B is a sectional view.

As shown in FIGS. 2A and 2B, a display device according to this embodiment includes a display panel 100 configured to display an image, and a sound generating actuator 200 which is attached to a surface of the display panel and vibrates the display panel to generate sound.

The sound generating actuator 200, which is described below in more detail with reference FIGS. 4A and 4B, includes a magnet, a plate supporting the magnet, a center pole protruding from a central area of the plate, and a bobbin disposed to surround the center pole and having a coil wound thereon, to which an electric current for generating sound is applied, wherein a distal end of the bobbin is attached to one surface of the display panel.

As shown in FIG. 2B, the display device may include a support structure configured to support one or more of the rear surface or a side surface of the display panel, and the plate of the sound generating actuator may be fixed to the support structure.

The support structure includes a cover bottom 300 disposed at the rear surface of the display panel, and may further include a middle cabinet 500 which is coupled to the cover bottom while surrounding the side surface of the display panel and receives and supports one side edge of the display panel.

The cover bottom configuring the support structure may be a plate-shaped member made of metal or plastic extending over the entire rear surface of the display device.

The cover bottom 300 in the present disclosure is not limited to the term thereof but may be used as other expressions, such as a plate bottom, a back cover, a base frame, a metal frame, a metal chassis, a chassis base, or m-chassis, and has a concept including all types of frames or plate-shaped structures, each of which may be arranged on the rear base part of the display device as a support for the display panel.

In the present specification, the term "display device" not only describes a display device, such as an OLED module or a Liquid Crystal Module (LCM) including a display panel and a driving unit for driving the display panel, but this term also includes a set electronic apparatus or a set apparatus, such as a notebook computer, a television, a computer monitor, or a mobile electronic device such as a smartphone or an electronic pad, which are finished products including such an LCM or OLED module.

For clarity, an LCM or OLED module configured by a display panel and a driving unit thereof may be expressed as a "display device", and an electronic apparatus, as a finished product, including such an LCM or OLED module may be expressed as a "set apparatus". For example, the display device may include an LCD or OLED display panel and a source PCB, which is a control unit for driving the display panel, and the set apparatus may further include a set PCB, which is a set control unit electrically connected to the source PCB to control the entire set apparatus.

The display panel 100 used in the present embodiment includes all types of display panels including a liquid crystal display panel, an Organic Light Emitting Diode (OLED) display panel, and a Plasma Display Panel (PDP) and is not limited to a specific display panel, as long as the display panel is directly vibrated by the sound generating actuator 200 to generate sound wave.

When the display panel is a liquid crystal display panel, the display panel may include: a plurality of gate lines; a plurality of data lines; pixels defined at intersecting areas between the gate lines and data lines; an array substrate including a thin-film transistor, which is a switching device configured to adjust a light transmission degree at each pixel; an upper substrate including a color filter and/or a black matrix; and a liquid crystal material layer formed therebetween.

When the display panel is an OLED display panel, the display panel may include: a plurality of gate lines; a plurality of data lines; pixels defined at intersecting areas between the gate lines and data lines; an array substrate including a thin-film transistor, which is a switching device configured to selectively apply a voltage to each pixel; an OLED layer disposed on the array substrate; and a sealing substrate or an encapsulation substrate disposed on the array substrate to cover the OLED layer. The sealing substrate protects the thin film transistor and the OLED layer from external impact and prevents moisture from permeating the OLED layer.

Although there is no limitation in the type of the display device used in a display device according to this embodiment, it may be preferred that the display panel is an OLED display panel by the reasons described below.

Specifically, a liquid crystal display panel has many laminated layers and requires an indirect light source type back-light having a separate light source disposed therein. Therefore, when the liquid crystal display panel is directly vibrated by the sound generating actuator 200, the directivity of the liquid crystal material may be shaken and thus cause distortion of an image.

In contrast, since the OLED device of the OLED display panel is an emissive element, the OLED display panel does not require a separate light source and has one panel in which multiple layers including a polarization layer, a glass layer, and an encapsulation layer are integrated. Therefore, even when the OLED display panel is directly vibrated by the sound generating actuator 200, the vibration has nearly no influence on the light emitting property of the organic light emitting layer and thus causes no image distortion. Therefore, in an embodiment of the present disclosure, an OLED display panel is preferably used.

The display panel used in a display device according to an embodiment of the present disclosure has a general structure, so a more specific description thereof will be omitted.

The display device according to an embodiment of the present disclosure may further include a baffle part 400 configured to form an air gap, which is a space disposed between the display panel and a support structure, i.e., the cover bottom 300 or the middle cabinet 500, to transfer the generated sound wave.

That is, by coupling the display panel to the cover bottom at an edge of the air gap and sealing the same, the air gap may be defined as an area sealed in all directions, and such a sealed air gap may be expressed as a baffle structure.

Figure 7A:
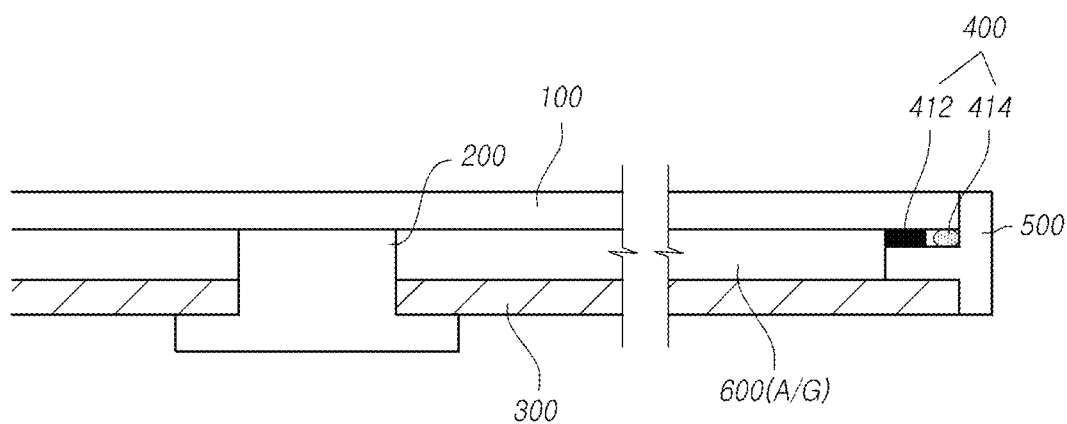
FIGS. 7A to 7C illustrate an example of a baffle part formed between a display panel and a middle cabinet, which is one of the structures for supporting the display panel to form a sound transferring air gap between the display panel, which serves as a vibrating plate, and a cover bottom.
Figure 7B:
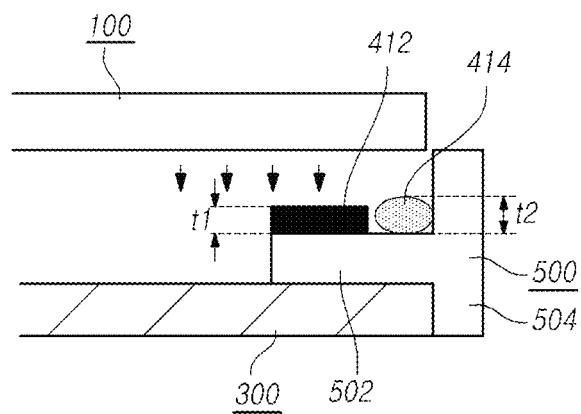
Figure 7C:
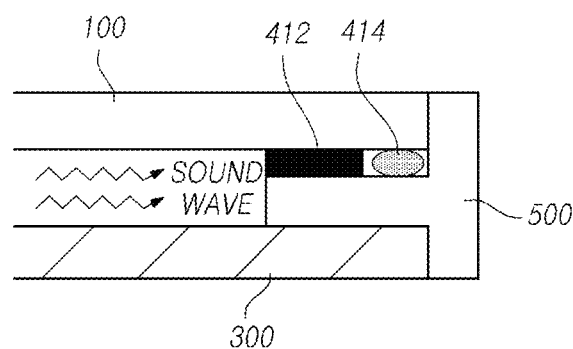

Referring to FIGS. 7A to 7C, the baffle part 400 may include an adhesive part 412 disposed at an edge of the cover bottom or middle cabinet and is attached to the lower surface of the display panel, and a sealing part 414 disposed outside the adhesive part to reinforce the sealing of the air gap 600.

The adhesive part 412 may be configured by a double sided tape. It is preferred that the height of the sealing part 414 is higher than the height of the adhesive part 412 as described below in more detail with reference to FIGS. 7A to 7C.

Figure 3A:
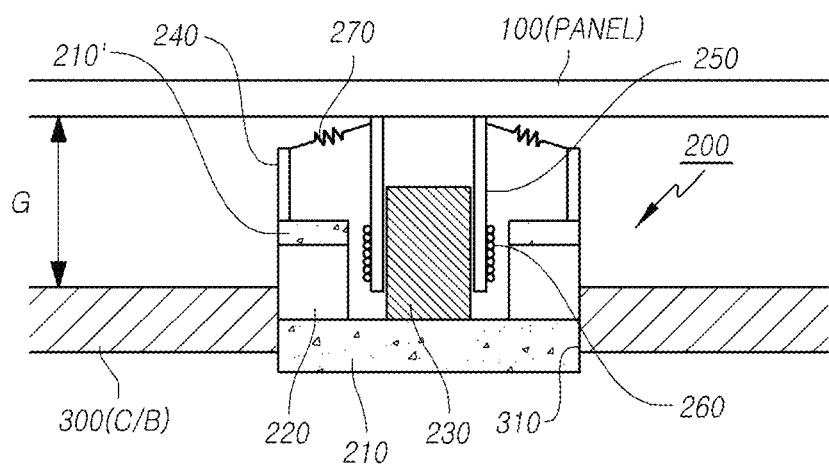
FIGS. 3A and 3B are sectional views of two types of sound generating actuators used according to embodiments of the present disclosure.
Figure 3B:
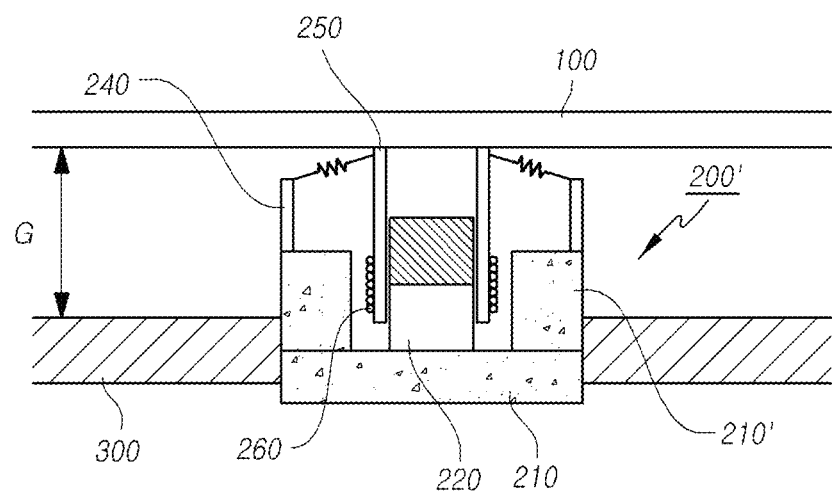

FIGS. 3A and 3B are sectional views of two types of sound generating actuators used according to embodiments of the present disclosure.

A sound generating actuator 200 used in these embodiments may include a magnet 220, which is a permanent magnet, plates 210 and 210' configured to support the magnet, a center pole 230 protruding from a central area of the plate 210, a bobbin 250 disposed to surround the center pole 230, and a coil 260 wound around the bobbin, wherein an electric current for generating sound is applied to the coil 260.

The sound generating actuator used in the present embodiment may include both a first structure in which the magnet is disposed outside the coil and a second structure in which the magnet is disposed inside the coil.

FIG. 3A illustrates the first structure having the magnet disposed outside the coil, which may be called a dynamic type or an external magnet type.

In the sound generating actuator of the first structure, the lower plate 210 is fixed to a support hole 310 formed at the cover bottom 300 and the magnet 220, which is a permanent magnet having an annular shape, and is disposed on the lower plate and surrounding the center pole 230.

The upper plate 210' is disposed on the magnet 220, and an external frame 240 protruding from the upper plate is disposed outside the upper plate.

The center pole 230 protrudes from the central area of the lower plate 210 and the bobbin 250 surrounds the center pole 230.

The coil 260 is wound around a lower portion of the bobbin 250, and the electric current for generating sound is applied to the coil.

A damper 270 may be disposed between an upper part of the bobbin and the external frame 240.

The lower plate 210 and the upper plate 210' fix the sound generating actuator 200 to the cover bottom 300 while supporting the magnet 220, the lower plate 210 has a cylindrical shape as shown in FIG. 3A, the magnet 220 having a ring shape is disposed on the lower plate 210, and the upper plate 210' is disposed on the magnet.

As the lower plate 210 and the upper plate 210' are coupled to the cover bottom 300, the magnet 220 disposed between the lower plate 210 and the upper plate 210' can be fixedly supported.

The plate may be formed of a material having a magnetic property, such as ferrite Fe. The plate is not limited to the term thereof and may be expressed by another term, such as a yoke.

The center pole 230 and the lower plate 210 may be integrally formed.

The bobbin 250 is a cylindrical structure formed by paper or aluminum sheet, and the coil 260 is wound around a predetermined lower area of the bobbin. A combination of the bobbin and the coil may be referred to as a voice coil.

When the electric current is applied to the coil, a magnetic field is formed around the coil. Then, due to an external magnetic field formed by the magnet 220, the entire bobbin moves upward while being guided by the center pole according to Fleming's Law.

Meanwhile, since the distal end of the bobbin 250 is attached to the rear surface of the display panel 100, the bobbin vibrates the display panel based on the application or non-application of the electric current, and such vibrations generate sound waves.

The magnet 220 may be a sintered magnet, such a barium ferrite, or may be a cast magnet made from an alloy of ferric oxide (Fe2O3), barium carbonate (BaCO3), strontium ferrite having an improved magnetic component, aluminum (Al), nickel (Ni), and cobalt (Co), without being limited thereto.

A damper 270 is disposed between an upper part of the bobbin 250 and the external frame 240, and the damper 270 has a wrinkle structure and thus contracts or expands to adjust the up-down vibration of the bobbin according to the up-down movement of the bobbin. That is, since the damper 270 is connected to the bobbin 250 and to the external frame 240, the up-down vibration of the bobbin is restricted by the restoring force of the damper 270. Specifically, when the bobbin 250 vibrates upward beyond a predetermined height or downward beyond a predetermined level, the restoring force of the damper 270 can return the bobbin to its original position.

The damper may be expressed by another term, such as an edge.

FIG. 3B illustrates the second structure having the magnet disposed inside the coil, which may be expressed as a micro type or an internal magnet type.

In the sound generating actuator of the second structure, the lower plate 210 is fixed to a support hole 310 formed at the cover bottom 300, the magnet 220 is disposed at a central area of the lower plate, and the center pole extends upward from the top of the magnet.

The upper plate 210' protrudes from a peripheral part of the lower plate 210, and the external frame 240 is disposed on the edge of the upper plate 210'.

The bobbin 250 is disposed to surround the magnet 220 and the center pole 230, and the coil 260 is wound around the bobbin.

The damper 270 is disposed between the external frame 240 and the bobbin.

The sound generating actuator of the second structure shown in FIG. 3B has a smaller leakage of magnetic flux than that of the first structure shown in FIG. 3A and thus, the corresponding display device can have a smaller size. However, the sound generating actuator of the second structure may undergo reduction of magnetic flux due to a large current input and is difficult to manufacture.

In these embodiments, both the actuators of the first structure and the second structure may be used, and the following description discusses the first structure as a representative for convenience of description.

The sound generating actuator used in a display device according to an embodiment of the present disclosure is not limited to the type illustrated in FIGS. 3A and 3B, and includes other types of actuators as long as the actuators can vibrate a display panel up and down to generate sound in response to application of the electric current.

Figure 4A:
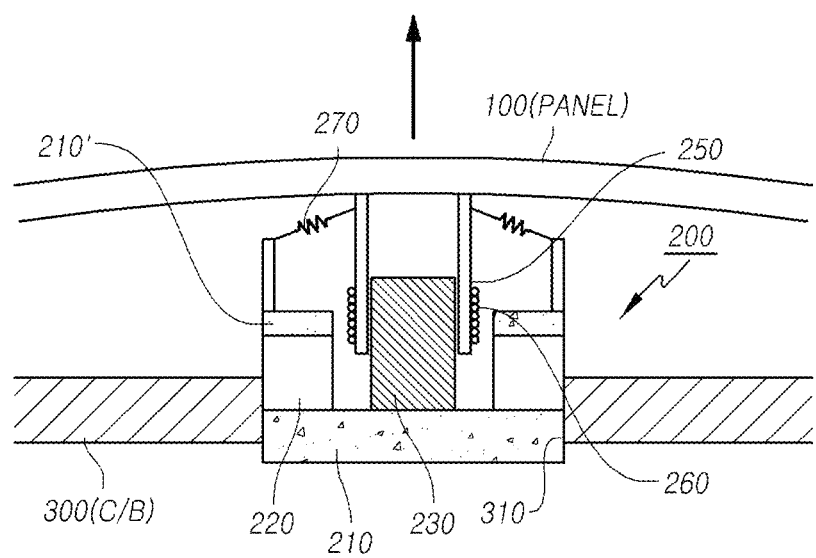
FIGS. 4A and 4B illustrate a state in which a sound generating actuator according to an embodiment of the present disclosure vibrates a display panel to generate sound.
Figure 4B:
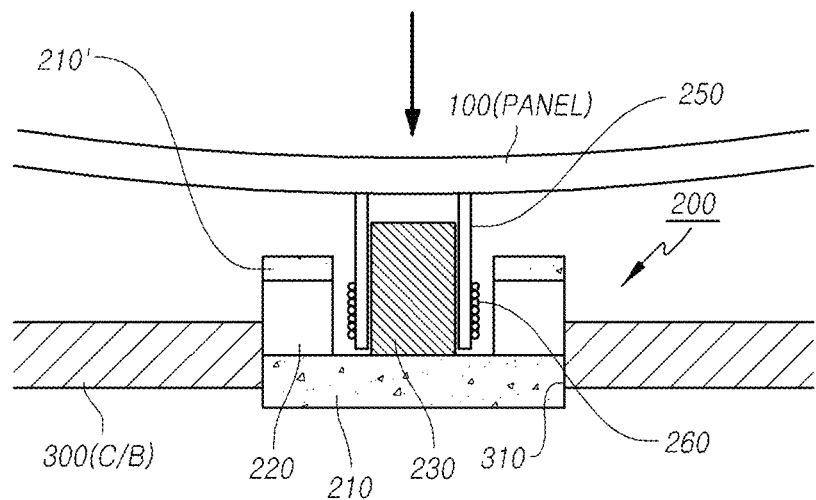

FIGS. 4A and 4B illustrate a state in which a sound generating actuator according to an embodiment of the present disclosure vibrates a display panel to generate sound.

FIG. 4A illustrates a state in which the electric current has been applied, wherein the center pole connected to the lower surface of the magnet serves as the N pole and the upper plate connected to the upper surfaces of the magnet serves as the S pole to establish an external magnetic field between coils.

In this state, if an electric current for generating sound is applied to a coil, an applied magnetic field is generated around the coil. The applied magnetic field generates, together with the external magnetic field, a force of moving the bobbin upward.

By the force, the bobbin moves upward and the display panel coupled to the distal end of the bobbin moves upward, as shown in FIG. 4A.

In this state, if the application of the electric current is interrupted or the electric current is applied in the opposite direction, a force of moving the bobbin downward is generated in the same principle, and the display panel thus moves downward.

In this way, according to the direction and magnitude of the electric current applied to the coil, the display panel vibrates up and down to generate sound wave.

Figure 5A:
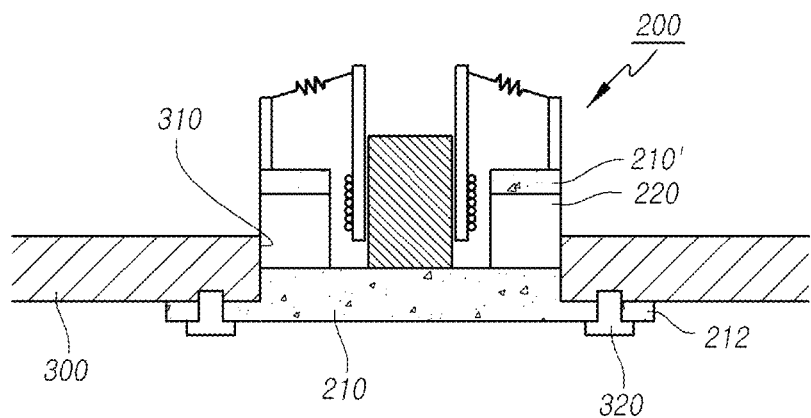
FIGS. 5A and 5B illustrate an example of a coupling state between a sound generating actuator according to an embodiment of the present disclosure and a cover bottom, which is a supporting structure of a display device.
Figure 5B:
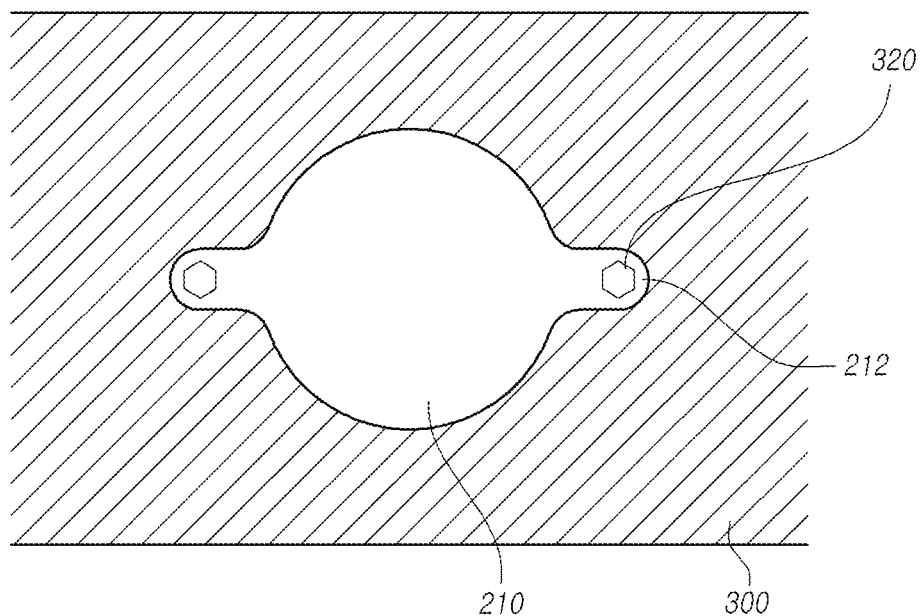

FIGS. 5A and 5B illustrate an example of a coupling state between a sound generating actuator according to an embodiment of the present disclosure and a cover bottom, which is a supporting structure of a display device.

Figure 6A:
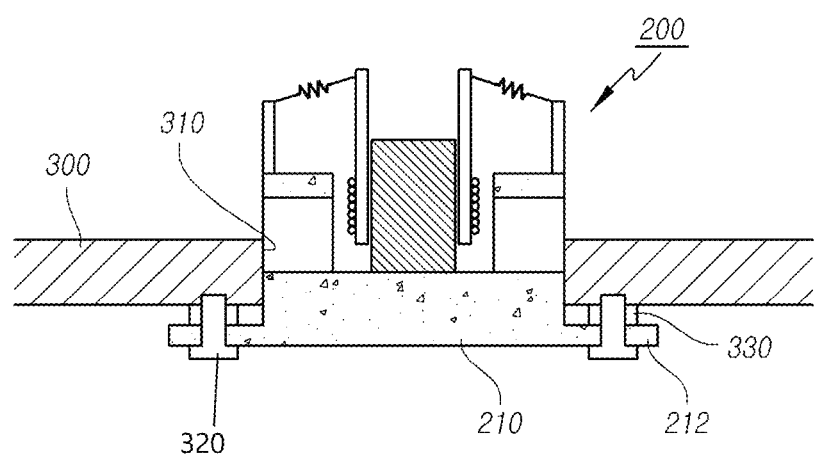
FIGS. 6A and 6B illustrate other embodiments of a coupling state between a sound generating actuator and a cover bottom.
Figure 6B:
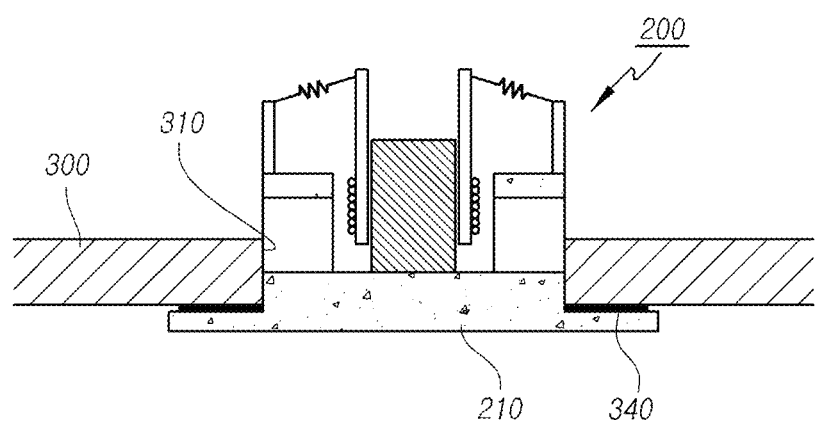

FIGS. 6A and 6B illustrate other embodiments of a coupling state between a sound generating actuator and a cover bottom.

The sound generating actuator 200 according to an embodiment of the present disclosure may be inserted through and supported by a support hole formed on a cover bottom or back cover, which is a support structure of a display device. FIGS. 5A to 6B illustrate various support structures.

In the support structure of FIG. 5, a support hole 310 is formed through the cover bottom 300, and at least one among the lower plate 210 of the sound generating actuator 200, the magnet 220, and the upper plate 210' is inserted and received in the support hole.

An extension part 212 extending outward from the lower plate is additionally formed on the lower surface of the lower plate 210, and the extension part 212 is fixed to the lower surface of the cover bottom 310 to allow the sound generating actuator 200 to be mounted to the cover bottom.

In this way, when the sound generating actuator 200 is inserted in and fixed to the support hole formed through the cover bottom, the distance between the display panel and the cover bottom can be reduced to thereby reduce the thickness of the display device.

In other words, although an air gap in which the display panel can vibrate should be arranged between the display panel and the cover bottom, the sound generating actuator inserted in/fixed to the support hole of the cover bottom can minimize the air gap due to the reduced height of the sound generating actuator disposed between the rear surface of the display panel and the inner surface of the cover bottom.

In the structure illustrated in FIGS. 5A and 5B, a screw hole is formed on the rear surface of the cover bottom, and a bolt 320 or a screw is fastened through the screw hole formed through the extension part 212 of the lower plate to the screw hole of the cover bottom to fix the sound generating actuator to the cover bottom.

Meanwhile, in the structure illustrated in FIG. 6A, which is not a simple screw-coupling structure, a PEM™ nut 330 or self-clinching nut is placed to secure a predetermined distance between the cover bottom 300 and the extension part 212 of the lower plate, and the actuator is then fixed by the bolt 320.

Use of the PEM nut 330 or self-clinching nut as shown in FIG. 6A can secure a predetermined space between the sound generating actuator and the cover bottom, thereby minimizing the transfer of the vibrations from the actuator to the cover bottom.

In the structure shown in FIG. 6B, an adhesive member, such as a double-sided tape, is disposed between the cover bottom and the extension part 212 of the lower plate of the actuator to attach and fix them to each other.

When the adhesive member as shown in FIG. 6B has a properly adjusted elasticity and thickness, the adhesive member can function as a kind of damper to minimize the transfer of the vibrations from the actuator to the cover bottom.

The structures as shown in FIGS. 5A to 6B in which the sound generating actuator 200 attached to the display panel to directly vibrate the display panel is inserted in and fixed to a support hole formed through the cover bottom can reduced the thickness of the display device in comparison with the structure in which the actuator is completely received in the display device.

FIGS. 7A to 7C illustrate an example of a baffle part formed between a display panel and a middle cabinet, which is one of structures for supporting the display panel, in order to form an air gap between the display panel, which serves as a vibrating plate, and a cover bottom.

As shown in FIG. 7A, the panel vibration type sound generating apparatus according to this embodiment secures an air gap 600, which is a space allowing the panel to be vibrated by the sound generating apparatus 200, between the display panel 100 and a support structure (cover bottom 300).

Further, one side of the display panel is coupled to the support structure of the display panel to generate sound waves during the vibration of the display panel. Especially, the generated sound should not leak to the outside through a side, etc. of the display device.

To this end, the display device according to this embodiment has a baffle part 400 formed between the lower surface of the display panel and the support structure.

Specifically, it is preferred that a predetermined section (that is, air gap) is defined around the sound generating actuator, a baffle part is disposed between the upper surface of the cover bottom or middle cabinet and the lower surface of the display panel at an edge of the section, and the baffle part 400 includes an adhesive member 412, such as a double-sided tape, attached between the lower surface of the display panel and the upper surface of the support structure of the display device, and a sealing part 414 disposed outside the adhesive member.

The section in which the baffle part is formed may be the entire display panel area defined by four outer sides of the display panel. However, the section is not limited to such a definition and may be defined by an area excluding the area in which a source PCB is disposed, as described below.

When two or more sound generating actuators are arranged to implement stereo or three-dimensional sound, two or more sections may be separately arranged to form the baffle part.

As shown in FIGS. 7A to 7C, the support structure of the display device may include a middle cabinet 500, which is coupled to the cover bottom and is configured to allow a part of the display panel to be stably placed thereon, in addition to the cover bottom 300 covering the entire rear surface of the display panel.

The middle cabinet 500 is a frame-shaped member formed along the outer periphery of the display panel, and includes a horizontal support part 502 on which a part of the display panel is stably placed, and a vertical support part 504 bent perpendicularly in opposite directions from the horizontal support part to cover the side surface of the cover bottom and the side surface of the display panel. Therefore, the middle cabinet may have a shape of a letter "T" in general.

The middle cabinet 500 configures an external ornamental part of the side surface of the display device or set apparatus, and may not be used or integrally formed with the cover bottom in some cases.

According to the embodiment of FIG. 7A, the adhesive member 412 configuring the baffle part 400 is a double-sided tape disposed between the upper surface of the horizontal support part of the middle cabinet 500 and the display panel and fixes the lower surfaces of the display panel to the middle cabinet.

The sealing part 414 configuring the baffle part is placed outside of the adhesive member and preferably has a thickness or height larger than the thickness or height of the adhesive member.

The sealing part 414 may be made from a material having a large elasticity, such as rubber, and has a thickness t2 larger than the thickness t1 of the adhesive member 412 as illustrated in FIG. 7B.

That is, as illustrated in FIG. 7B, one adhesive surface of the adhesive member 412, which is a double-sided tape having a thickness t1, is attached to the inner part of the upper surface of the horizontal support part 502 of the middle cabinet 500, and the sealing part 414 made of an elastic material having a thickness larger than t1 is disposed outside the adhesive member.

In this state, the display panel 100 is attached to the other adhesive surface of the adhesive member 412. Then, the display panel is attached to the middle cabinet while pressing, to a certain degree, the sealing part 414 having the larger thickness. (FIG. 7C)

As a result, the sealing of the air gap around the sound generating actuator is further enhanced.

The structure illustrated in FIG. 7C, in which the display panel 100 and the cover bottom 300 are coupled to each other while forming the air gap 600 to be as wide as the thickness of the adhesive member 412 and the horizontal support part 502 of the middle cabinet, can secure a vibration space in which the display panel can generate sound, and can prevent the internally generated sound waves from leaking to the outside along the side surface of the display device.

The baffle part 400 disposed at an edge of the air gap, which has a double structure of the adhesive member 412 and the sealing part 414 while allowing the sealing part to have a larger thickness, can further enhance the sealing of the air gap and prevent leakage of the sound.

It should be construed that the middle cabinet 500 used in the present specification may be replaced by another term, such as a guide panel, a plastic chassis, a p-chassis, a support main, a main support, or a mold frame, and includes all types of members, which are structures having a shape of a four-sided frame and having a sectional shape including multiple bent portions and are connected to the cover bottom to be used to support the display panel and the baffle part.

The middle cabinet 500 may be made of synthetic resin, such as a polycarbonate, by injection molding, without being limited thereto.

Figure 8:
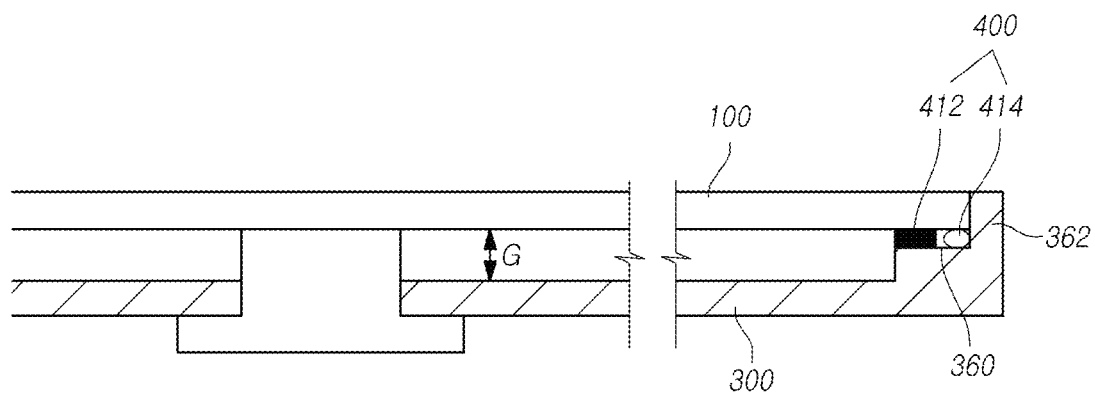
FIG. 8 illustrates a structure of a baffle part according to another embodiment in which the adhesive member and the sealing part are placed directly on a cover bottom.

FIG. 8 illustrates a structure of a baffle part according to another embodiment in which the adhesive member and the sealing part are placed directly on a cover bottom.

Although a middle cabinet is used to support the cover bottom and the display panel in the embodiment described above, the middle cabinet may not be always required.

The embodiment illustrated in FIG. 8 shows a structure in which the cover bottom 300 supports one side of the display panel while forming an external appearance of the side surface of the display device without a middle cabinet.

The structure illustrated in FIG. 8 includes a cover bottom 300 in which a step portion 360 protrudes upward from a base surface at one side of the cover bottom 300 and a side surface supporting part 362 vertically extends from the outside of the step portion 360.

A part of the edge of the display panel 100 is stably placed on and attached to the step portion 360 of the cover bottom 300, the side surface support part 362 of the cover bottom surrounds and protects the side surface of the display panel 100, and the cover bottom resultantly forms an external ornamental part of the entire side and rear surfaces of the display device.

In this structure, in order to configure the baffle part 400 for generation of sound, the adhesive member 412 in the form of a double-sided tape is disposed inside the step portion 360 of the cover bottom and the sealing part 414 having a thickness larger than that of the adhesive member is disposed outside the adhesive member.

In this state, the display panel 100 is placed on the step portion 360 of the cover bottom and is attached to one adhesive surface of the adhesive member 412, so that the display panel is coupled to the cover bottom. Then, the sealing part 414 is compressed to secure and enhance the sealing of the air gap for transfer of sound.

The embodiment of FIG. 8 has a simple structure without a middle support structure like the middle cabinet and includes the baffle part 400, which is disposed at an edge of the air gap and has a double structure of the adhesive member 412 and the sealing part 414 while allowing the sealing part to have a larger thickness. Therefore, the embodiment of FIG. 8 can secure a vibration space in which the display panel can generate sound, and can prevent the internally generated sound waves from leaking to the outside along the side surface of the display device.

The thickness of the air gap, that is, the distance G between the display panel and the cover bottom, may have a value of about 1.0 to 3.0 mm in an embodiment of the present disclosure. However, the thickness is not limited to the range and may have a value in a range different according to the degree of vibration of the display panel, etc.

However, in order to reduce the thickness of the display device, it is preferable to minimize the thickness G of the air gap in consideration of the quantity of vibration of the display panel by the sound generating actuator, the range of sound to be output, and the quantity of output. In an embodiment of the present disclosure, an optimum thickness of the air gap G is about 2.0 mm.

Figure 9A:
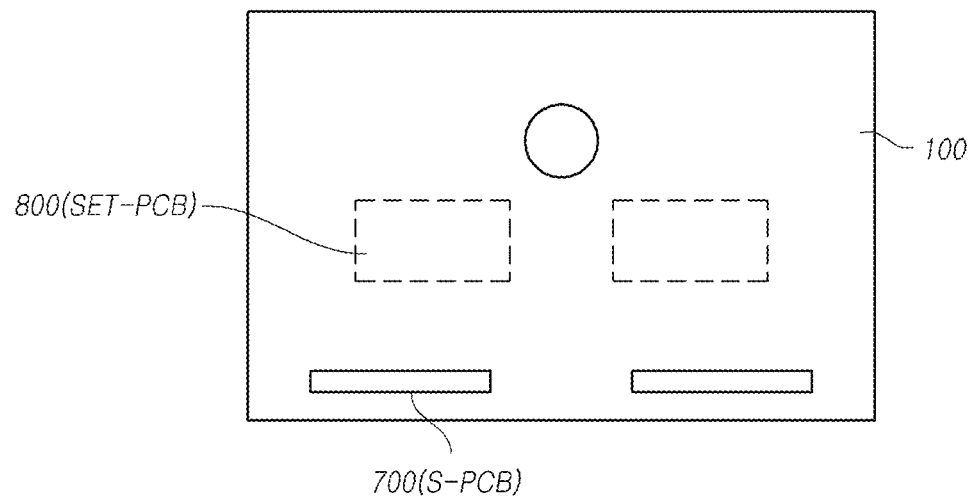
FIGS. 9A and 9B illustrate a locational relation between a source PCB for driving a display panel and a set PCB for driving a set apparatus, which are arranged at the rear surface of a display device.
Figure 9B:
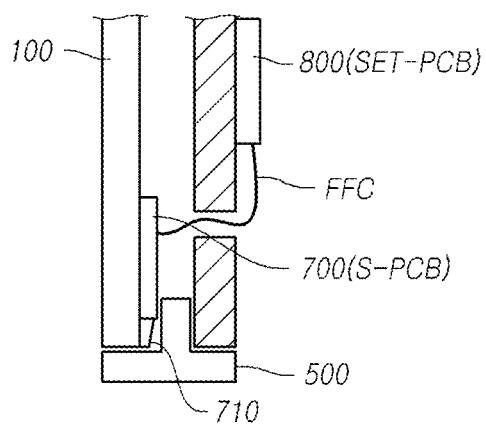

FIGS. 9A and 9B illustrate a locational relation between a source PCB for driving a display panel and a set PCB for driving a set apparatus, which are arranged at the rear surface of a display device.

As shown in FIGS. 9A and 9B, the display device includes a source PCB, which is a circuit board including a Source Driver Integrated Circuit (S-DIC) for driving a display panel to drive data lines formed on the display panel and is referred to as simply "S-PCB".

The display device or a set apparatus including the same is connected to the S-PCB and may further include a Control Printed Circuit Board (C-PCB) having control parts and various electric devices mounted thereon to generally control the display device or set apparatus.

Specifically, an OLED display device, to which the present embodiment is applicable, may include: an OLED display panel 100 including a plurality of data lines DL, a plurality of gate lines, and a plurality of sub-pixel SP arranged thereon; a data driver configured to drive the plurality of data lines DL; a gate driver configured to drive the plurality of gate lines GL; and a controller configured to control the data driver and the gate driver.

The controller supplies various control signals to the data driver and the gate driver to control the data driver and the gate driver, starts scanning according to a timing implemented in each frame, converts image data input from the outside into a data signal format used in the data driver and outputs a converted image data, and properly controls the driving of the data driver according the scanning.

The controller may be a timing controller used in a general display technology or may be a control apparatus including a timing controller to further perform another control function.

The data driver supplies a data voltage to the plurality of data lines DL to drive the data lines DL. Herein, the data driver is also referred to as a "source driver".

The data driver may include at least one Source Driver Integrated Circuit (S-DIC) to drive the plurality of data lines.

The gate driver sequentially supplies a scan signal to the plurality of gate lines GL to sequentially drive the gate lines GL. The gate driver is also referred to as a "scan driver" and may include at least one Gate Driver Integrated Circuit (G-DIC).

Each Source Driver Integrated Circuit (S-DIC) may be connected to a bonding pad of an OLED display panel either by a Tape Automated Bonding (TAB) method or a Chip On Glass (COG) method or directly. In some cases, S-DICs may be integrated and arranged in an OLED panel. Further, each S-DIC may be packaged on a film connected to an OLED display panel by a Chip On Film (COF) method.

That is, a display device, to which the present embodiment is applicable, may include: at least one Source Printed Circuit Board (S-PCB) necessary for circuit connection of at least one Source Driver Integrated Circuit (S-DIC); and a Control Printed Circuit Board (C-PCB) or set PCB configured to mount control parts for controlling the entire display device and various electric devices thereon.

Here, at least one S-DIC may be mounted on or a Chip-On Film (COF) having at least one S-DIC mounted thereof may be connected to the at least one source PCB.

The C-PCB or set PCB 800 may include a controller configured to control operations of the data driver and the gate driver, and a Power Management IC (PMIC) configured to supply various voltages or currents to the display panel, the data driver, and the gate driver or control the various voltages or currents to be supplied.

The source PCB is usually located at one side among the upper side and the lower side of a display panel. However, according to the driving scheme or panel design scheme, the source PCB may be arranged on both the upper side and the lower side.

That is, as shown in FIGS. 9A and 9B, the source PCB 700 is connected to the display panel 100 and the COF 710 and is disposed on a lower rear surface of the display panel.

The C-PCB or set PCB 800 may be disposed at the outer rear side of the cover bottom 300 and connected through a flexible cable to the source PCB 700 located inside the cover bottom.

In the structure shown in FIGS. 9A and 9B, it is difficult to configure a baffle part as described above with reference to FIGS. 7A to 7C, at the lower side of the display panel having the sound generating actuator 200 mounted thereon.

In other words, since the source PCB 700 and the chip-on film 710 connected thereto are arranged in the vicinity of the lower side of the display panel, it is difficult to arrange the baffle part 400 including the adhesive member 412 and the sealing part 414, and the sealing of the air gap may be degraded even when the baffle part is arranged.

Further, the generated sound may leak backward through a cable passing hole, which is formed through a part at the lower side of the cover bottom to enable a flexible cable for connection between the source PCB 700 disposed inside the cover bottom and the set PCB 800 disposed outside the cover bottom to pass therethrough.

Therefore, in order to apply a sound generating apparatus of the present embodiment to a display device having the structure as shown in FIGS. 9A and 9B, it is necessary to solve the problems of degradation in the sealing of the baffle part and the sound leakage. In this respect, an embodiment, as shown in FIGS. 10A and 10B, is presented.

Figure 10A:
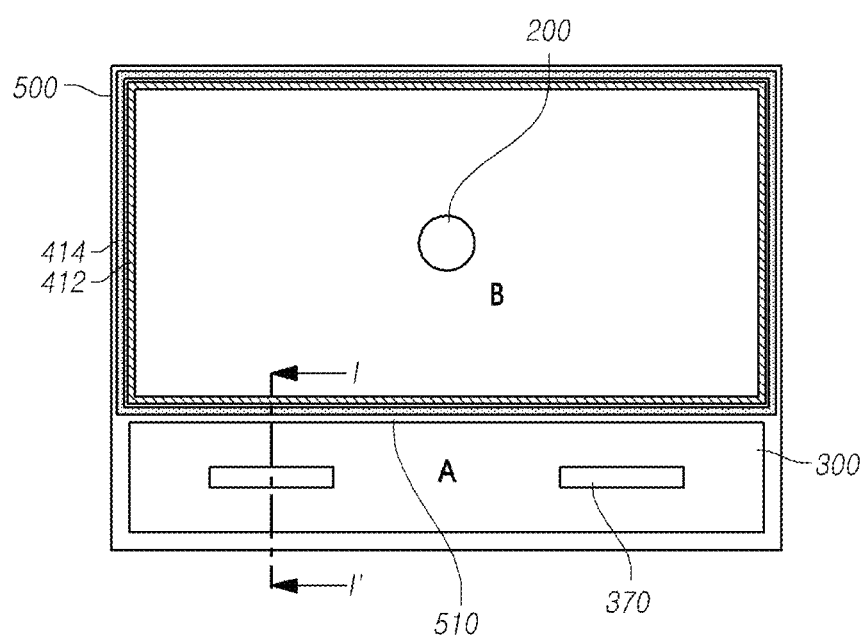
FIGS. 10A and 10B illustrate an embodiment which further includes an area division member additionally formed on a middle cabinet, and a cable passing hole through which a connection cable (FFC) formed on a cover bottom passes.
Figure 10B:
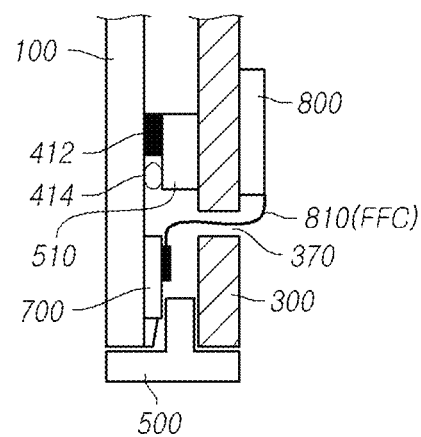

The embodiment illustrated in FIGS. 10A and 10B has a structure, which further includes an area division member 510 configured to partition the middle cabinet into two or more areas and has a baffle part formed on the area division member, in order to solve the problems of the structure described above with reference to FIGS. 9A and 9B. This embodiment also includes a cable passing hole through which a connection cable (FFC) formed on a cover bottom passes.

The area division member 510 divides the entire area of the middle cabinet surrounding the entire display panel into a first area A in which the source PCB is included and a second area B in which the source PCB is not included, wherein the sound generating actuator 200 is disposed in a part of the second area B.

The area division member may be manufactured in the form of a bar having a thickness corresponding to the horizontal support part of the middle cabinet to be attached to the middle cabinet 500 through welding, etc. However, the present disclosure is not limited thereto and the entire middle cabinet including the area division member 510 may be integrally manufactured as one unit.

As shown in FIG. 10A, an area division member 510 is lengthily disposed in the horizontal direction of the display device, and an adhesive member 412 and a sealing part 414 are arranged on the upper side of the area division member 510 and three sides of the middle cabinet corresponding to the second area B.

FIG. 10B is a sectional view taken along line I-I' of FIG. 10A, in which the adhesive member 412 and the sealing part 414 are arranged on the upper side of the area division member 510 to seal the second area B as an air gap.

In a part of the lower area of the cover bottom 300, specifically, among the areas divided by the area division member 510, a cable passing hole 370, through which a connection cable 810 connecting the source PCB 700 and the set PCB 800 is to pass, is formed in the first area A, which includes the source PCB.

The structure as shown in FIGS. 10A and 10B in which only the second area B, which does not include a source PCB is formed as a sound generating area can minimize the degradation of the sealing of the sound generating area by interference of the source PCB.

Further, the cable passing hole 370 disposed in the first area A including the source PCB can prevent sound leakage through the cable passing hole.

Figure 11A:
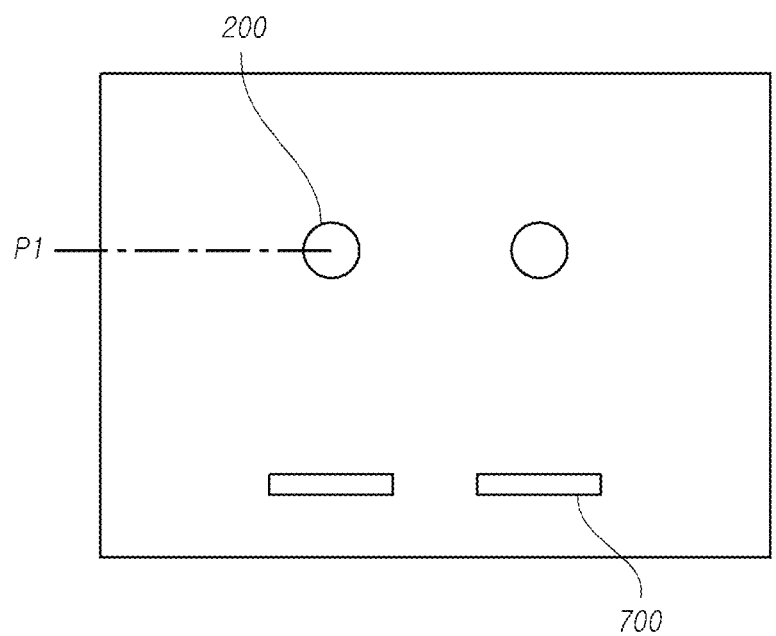
FIGS. 11A and 11B are schematic views showing the relative arrangement of the cover bottom and the source PCB for driving the display panel.
Figure 11B:
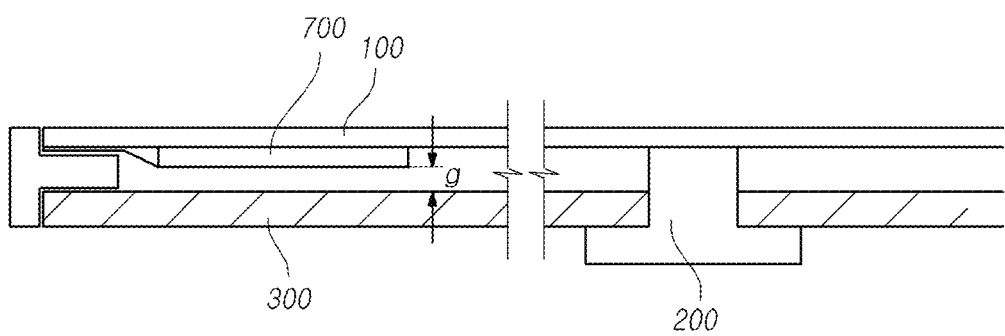

FIGS. 11A and 11B are schematic views showing the relative arrangement of the cover bottom and the source PCB for driving the display panel.

As shown in FIG. 11A, a source PCB 700 including an S-DIC or data driver is connected to the display panel through a chip-on film, etc., and is disposed at one side (lower side) of the display panel.

As shown in FIG. 11B, a gap g is formed between the source PCB and the cover bottom in the area in which the source PCB is disposed, and is smaller than a gap between the source PCB and the cover bottom in the other area.

Therefore, when the sound generating actuator 200 according to the present embodiment is arranged and vibrates the display panel, the source PCB, which integrally vibrates the display panel, may collide with the cover bottom in the area in which the source PCB is placed.

The collision between the source PCB and the cover bottom may generate noise and may even damage the source PCB.

Further, even without direct collision between the source PCB and the cover bottom, strong vibrations of the display panel at the time of sound generation may have an influence on the performance of the source PCB when the vibration is continuously transferred to the source PCB.

In order to solve this problem, arranging a buffer member for protecting the source PCB between the source PCB and the cover bottom or between the display panel and the cover bottom is proposed.

Figure 12A:
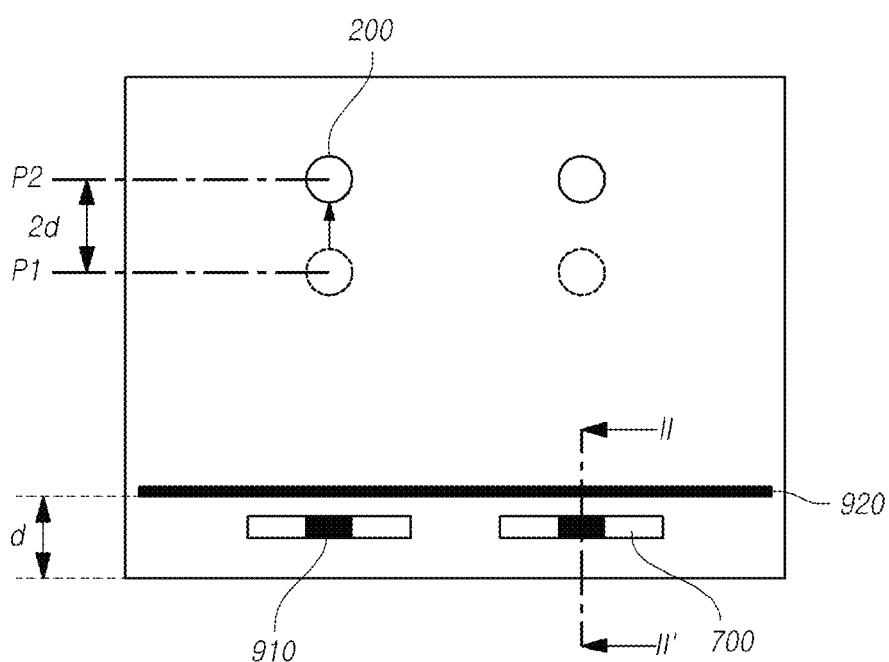
FIGS. 12A and 12B illustrate an embodiment including a buffer member capable of preventing interference and noise between the source PCB and the cover bottom illustrated in FIGS. 11A and 11B.
Figure 12B:
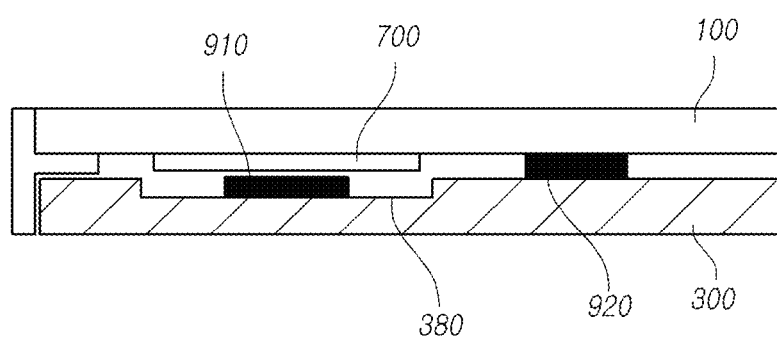

FIGS. 12A and 12B illustrate an embodiment including a buffer member capable of preventing interference and noise between the source PCB and the cover bottom illustrated in FIGS. 11A and 11B.

In the embodiment of FIGS. 12A and 12B, a source PCB 700 including a circuit element for driving the display panel is disposed at the rear surface of the display panel, a recessed part 380 is formed in an area of the cover bottom, which faces the source PCB, and a first buffer member 910 having a predetermined elasticity is placed on the upper surface of the concave part 380. The recessed part 380 may be concave, for example.

Further, a second buffer member 920 extending along a length of one direction may be additionally disposed on the cover bottom.

Specifically, as shown in FIG. 12A, the display panel may be divided into a first area A covering the source PCB and a second area B covering the sound generating actuator, and the second buffer member 920 is preferably disposed as being extended along a length of the first area A and second area B to separate the first area A and the second area B from each other.

Of course, although not illustrated, the baffle part 400 including the adhesive member 412 and the sealing part 414 described above with reference to FIGS. 7A to 8 may be disposed on all of the four sides of the display panel in the embodiment of FIGS. 12A and 12B.

The first buffer member 910 and the second buffer member 920 may be configured by a one-sided tape or double-sided tape. However, the present disclosure is not limited thereto, and the buffer member may include all types of members formed of rubber, plastic, paper, or other materials, which have a predetermined elasticity.

It is preferred that the first buffer member 910 is disposed on the concave part 380 of the cover bottom while the upper surface of the first buffer member 910 is spaced a predetermined distance apart from the source PCB and the second buffer member 920 has one surface in contact with the cover bottom and the other surface in contact with the lower surface of the display panel.

Of course, the first buffer member 910 may be placed on a part of the upper surface of the cover bottom, which faces the source PCB.

As shown in FIG. 12B, the concave part 380 formed at the cover bottom area corresponding to the source PCB increases the gap between the source PCB and the cover bottom to reduce the possibility that the source PCB may collide with the cover bottom even when the display panel vibrates to generate sound.

Moreover, the first buffer member 910 disposed on the concave part 380 of the cover bottom can buffer a large vibration of the display panel even when the source PCB moves toward the concave part of the cover bottom due to the larger vibrations, so as to reduce the generation of noise due to interference between the source PCB and the cover bottom and reduce the possibility of damage to the source PCB.

Further, when the display panel vibrates in the second area B, which is the sound generation area, the second buffer member 920 can prevent the vibration from being transferred to the source PCB 700 disposed on the rear surface of the display panel to some degree, and thus can minimize the degradation of performance of the source PCB due to continuous vibration of the display panel.

The location of the sound generating actuator may be changed according to the arrangement of the second buffer member 920.

That is, as shown in FIG. 12A, when the second buffer member 920 is spaced a distance d apart from the lower side of the display panel, the sound generating actuator 200 may be moved by about 2d from the initial position P1 and is then installed at position P2.

Changes in the sound output characteristics according to the installation of the second buffer member can be minimized by moving the sound generating actuator by about twice that of the space d between the second buffer member 920 and one side of the display panel.

Figure 13:
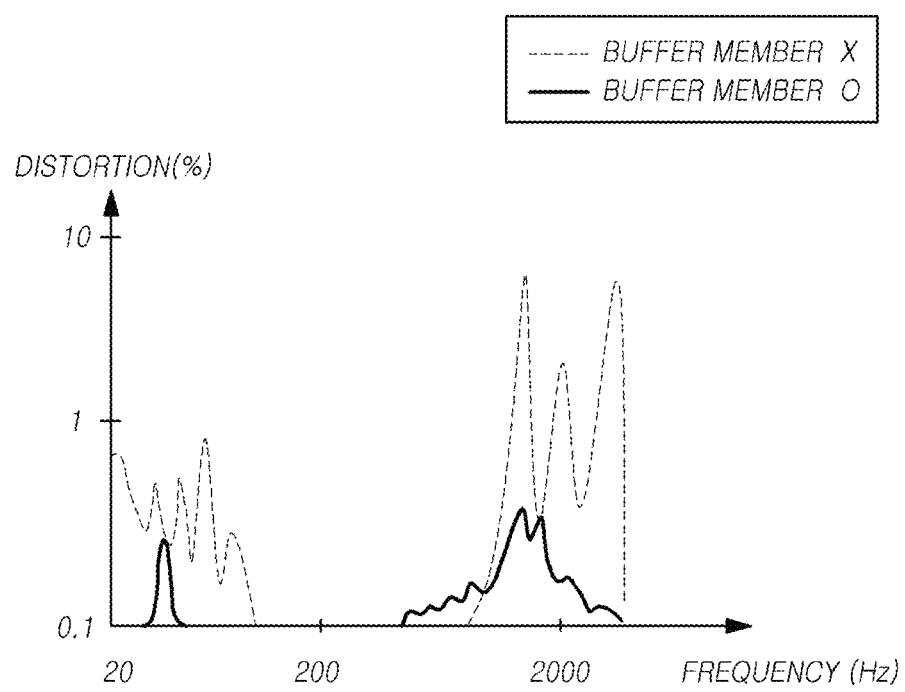
FIG. 13 is a graph illustrating a noise reduction effect when the buffer members of the embodiment illustrated in FIGS. 12A and 12B are used.

FIG. 13 is a graph illustrating a noise reduction effect in the case of using the buffer members of the embodiment illustrated in FIGS. 12A and 12B.

As a result of actual experiments, it has been confirmed that, when the first buffer member 910 and the second buffer member 920 described above with reference to FIGS. 12A and 12B are not used, unnecessary excessive noise was generated in a low sound range of several dozens of Hz and in a sound range of 1000 Hz or higher, as noted from the dotted line of FIG. 13.

In contrast, as noted from the solid line of FIG. 13, the noise is largely reduced in the corresponding bands when the buffer members of FIGS. 12A and 12B are used.

Figure 14:
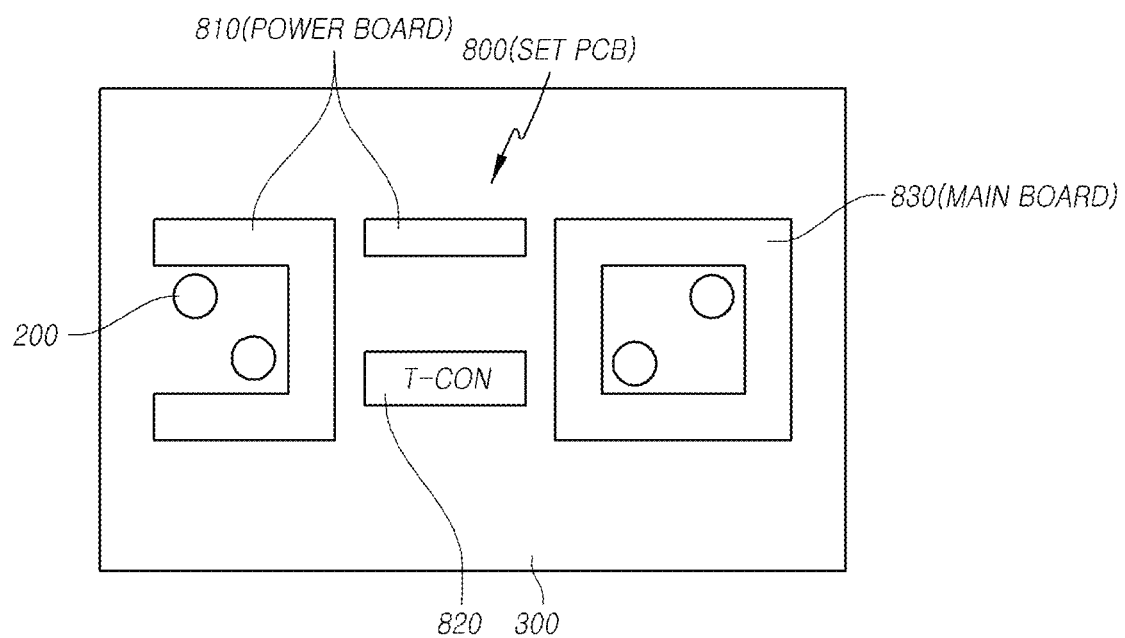
FIG. 14 illustrates a relative arrangement between a sound generating actuator and a set PCB in a display device according to an embodiment of the present disclosure.

FIG. 14 illustrates a relative arrangement between a sound generating actuator and a set PCB in a display device according to an embodiment of the present disclosure.

In general, a display device or a set apparatus including the display device includes not only a source PCB including a control circuit (data driver IC, etc.) for driving a touch function or a data line of a display panel, but also a set PCB connected to the source PCB to control the display device or the entire set apparatus and supply power thereto.

As described above with reference to FIGS. 10A and 10B, the source PCB is attached to the rear surface of the display panel and the set PCB is attached to the outer side of the rear surface support structure of the display device, such as a cover bottom or a back cover.

The embodiment of FIG. 14 provides a display device in which a sound generating actuator is placed at a first position of a support structure of the display device and a set PCB of a set apparatus is placed at a second position different from the first positions, so as to avoid interference between the sound generating actuator and the set PCB.

As illustrated in FIG. 14, the set PCB 800 placed on the rear surface of the cover bottom may include a power board 810 configured to supply power to the display panel, a timing controller 820 configured to generate a timing pulse or a timing signal for driving a gate line or data line, and a main board 830 including a control circuit for controlling the entire display device or set apparatus.

Boards 810, 820, and 830 of the set PCB 800 are attached to the rear surface of the cover bottom 300, and the sound generating actuator 200 is fixedly inserted in a support hole formed through the cover bottom as described above.

Therefore, it is preferable to place the sound generating actuator 200 (first position) and the set PCB (second position) at different positions, as shown in FIG. 14, to avoid interference therebetween.

Even when the sound generating actuator 200 is fixed within the cover bottom, if the positions of the sound generating actuator and the set PCB overlap, the vibration of the sound generating actuator may be continuously transferred to the circuit elements of the set PCB to have a bad influence on the performance of the set PCB.

Therefore, the arrangement of the sound generating actuator 200 (first position) and the set PCB (second position) at different positions as shown in FIG. 14 facilitates the arrangement design of elements and can minimize the degradation of the performance of the set PCB.

Figure 15A:
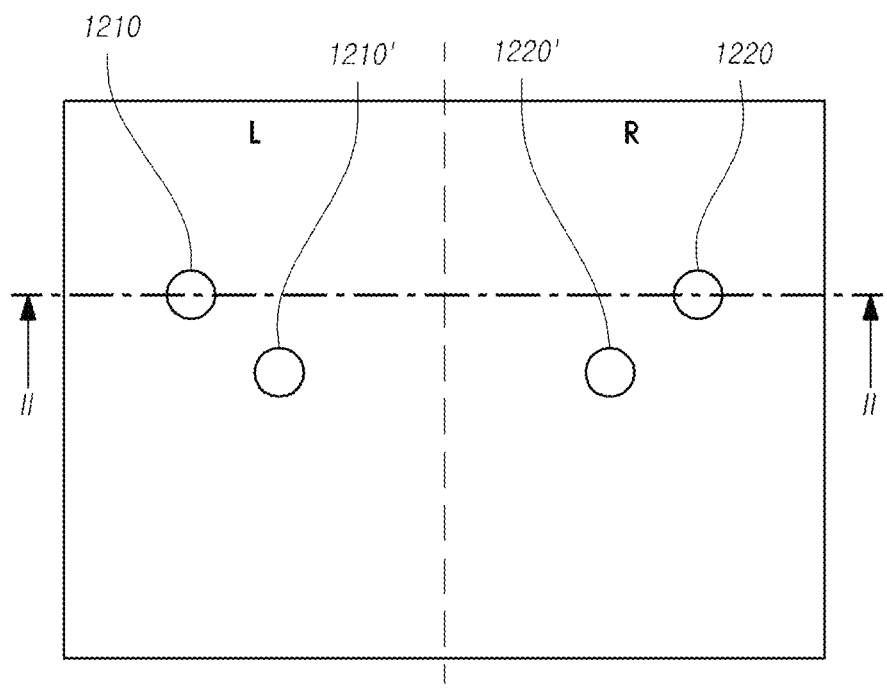
FIGS. 15A and 15B illustrate a display device including two or more actuators symmetrically arranged therein, and a distortion of a cover bottom due to a difference of vibration quantity in the display device.
Figure 15B:
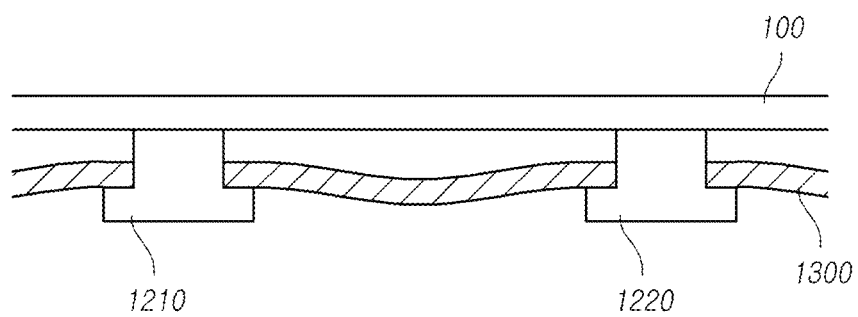

FIGS. 15A and 15B illustrate a display device including two or more actuators symmetrically arranged therein, and a distortion of a cover bottom due to a difference of vibration quantity in the display device.

According to the embodiment shown in FIGS. 15A and 15B, a plurality of sound generating actuators may be symmetrically arranged at left and right portions or upper and lower portions of the display panel to output different sounds at the areas.

For example, as shown in FIG. 15A, in order to implement stereo sound, one or two left sound generating actuators 1210 and 1210' are arranged at the left side of the display panel, one or two right sound generating actuators 1220 and 1220' are arranged at the right side of the display panel, and the left and right actuators may be differently vibrated.

As shown in FIG. 15B, which is a sectional view taken along line II-II' of FIG. 15A, when the different vibrations of the left and right actuators 1210 and 1220 are continuously repeated, the vibration difference between the left side and right side of the cover bottom 1300 is continuously accumulated.

Since the cover bottom is usually manufactured to have as thin a thickness as possible, the accumulation of the vibration difference between the left side and right side of the cover bottom may cause the cover bottom to be curved or deformed. That is, as shown in FIG. 15B, the cover bottom 1300 may be twisted or deformed. Further, even when the cover bottom 1300 is not deformed, the vibration difference of the cover bottom due to the vibration difference between the left and right actuators may cause distortion of the generated sound.

Figure 16A:
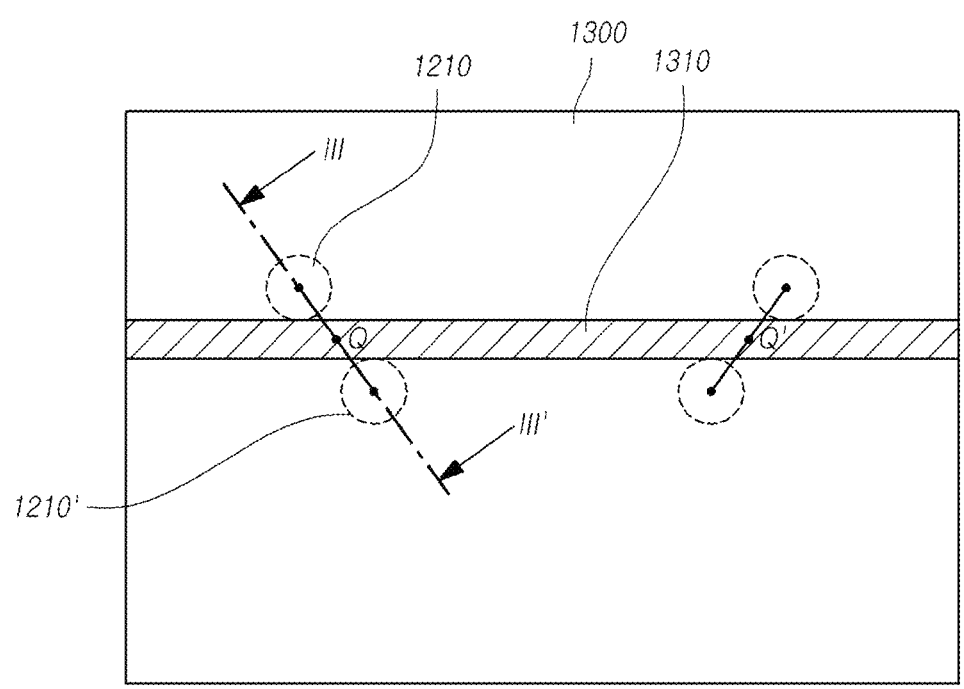
FIGS. 16A and 16B illustrate a structure which has a reinforcement member disposed inside a cover bottom in order to prevent generation of sound distortion by twisting or vibration of the cover bottom.
Figure 16B:
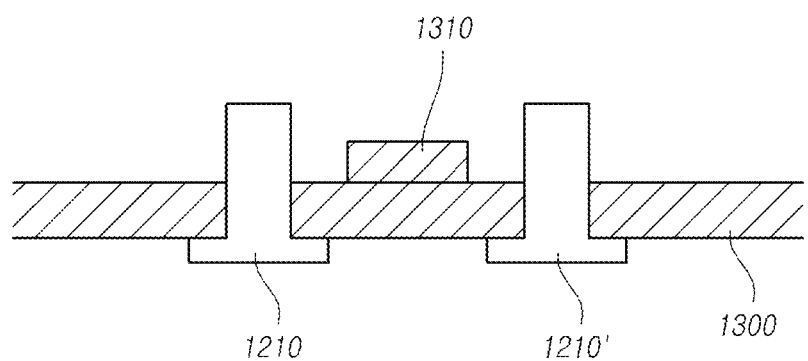

In order to solve this problem, a structure as shown in FIGS. 16A and 16B, which has a reinforcement member disposed inside a support structure of a display device while using two or more sound generating actuators is proposed.

This structure prevents the generation of sound distortion by twisting or vibration of the cover bottom.

In the embodiment illustrated in FIGS. 16A and 16B, at least one reinforcement member 1310 may be disposed inside or outside of the cover bottom in order to prevent deformation of the cover bottom or sound distortion by the unbalanced vibration of the cover bottom in the case of using multiple sound generating actuators having different vibration characteristics as described with reference to FIGS. 15A and 15B.

The reinforcement member 1310 may be formed to have a shape of a long bar passing through a portion adjacent to multiple sound generating actuators and are preferably arranged at particular positions to optimize the reinforcement characteristics.

As shown in FIG. 16A, when two left sound generating actuators 1210 and 1210' and two right sound generating actuators 1220 and 1220' are arranged, the reinforcement member 1310 may be disposed to extend through a middle point Q between the two left sound generating actuators 1210 and 1210' and a middle point Q' between the two right sound generating actuators 1220 and 1220'.

This arrangement can optimize the reinforcement performance of the reinforcement member 1310 even when the two left and right sound generating actuators have different vibration characteristics.

The reinforcement member 1310 may be manufactured in the form of a separate metal bar and is then attached to the inner surface of the cover bottom as shown in FIG. 16B, to which the present disclosure is not limited.

For example, the cover bottom may be manufactured through injection molding, and may have a reinforcement member 1310 integrally formed by protruding a part of the inner surface of the cover bottom.

The reinforcement member 1310 is not inevitably disposed on the inner surface of the cover bottom, but may be disposed on the outer surface of the cover bottom. However, in consideration of an external appearance and the thickness of the display device, it is preferred that the reinforcement member is disposed on the inner surface of the cover bottom 1300.

Figure 17A:
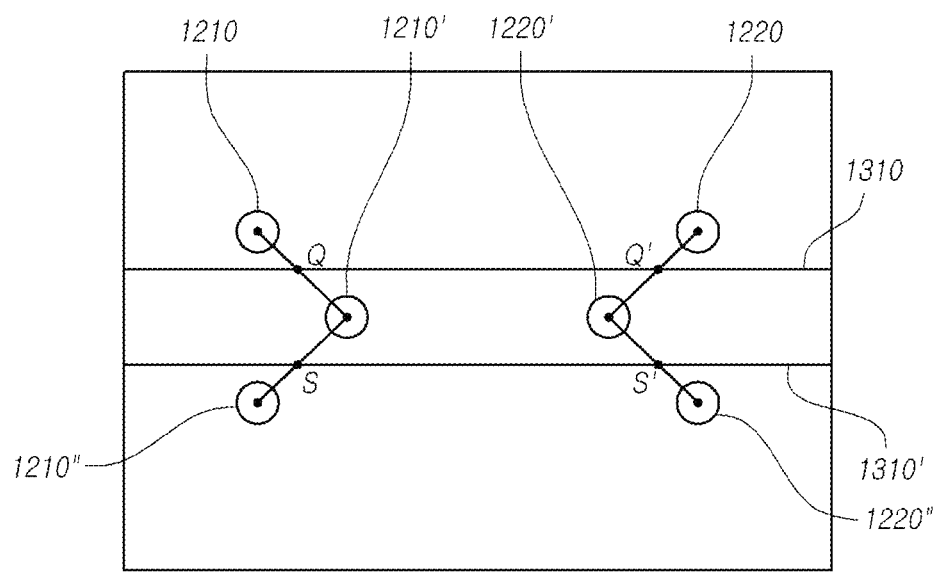
FIGS. 17A and 17B illustrate specific arrangements of reinforcement members on a cover bottom.
Figure 17B:
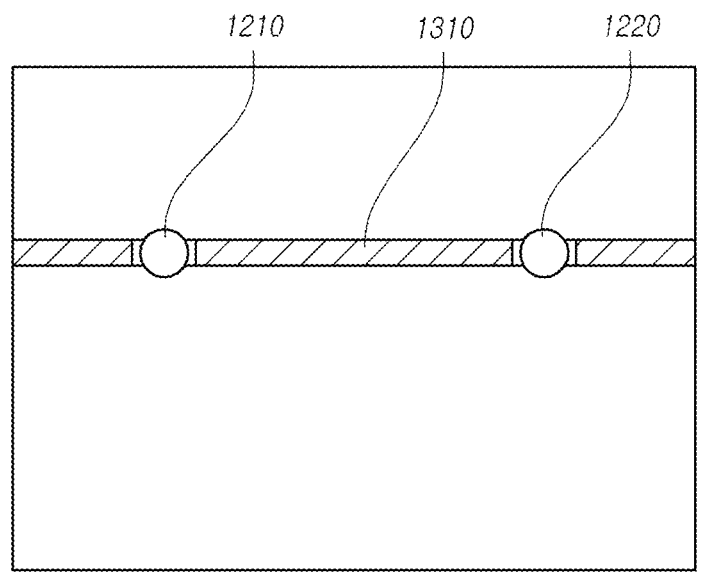

FIGS. 17A and 17B illustrate specific arrangements of reinforcement members on a cover bottom.

FIG. 17A illustrates a structure in which three sound generating actuators are arranged at each of the left side and right side thereof and two reinforcement members 1310 and 1310' are arranged, wherein a first reinforcement member 1310 is disposed to extend through middle points Q-Q' of segments, each of which connects to two upper actuators among the three left or right sound generating actuators, and a second reinforcement member 1310' is disposed to extend through middle points S-S' of segments, each of which connects to two lower actuators among the three left or right sound generating actuators.

FIG. 17B illustrates a structure in which only one left actuator and only one right actuator are arranged and the reinforcement member 1310 is disposed to extend through centers of the left and right actuators 1210 and 1210'. In this structure, two divided reinforcement members may be formed in consideration of the arrangement structure of the actuators inserted in and supported by the cover bottom.

The symmetric arrangement of two or more sound generating actuators having different vibration characteristics as described above can prevent deformation (twisting) of the cover bottom due to the different vibration characteristics of the sound generating actuators or sound distortion by the vibration of the cover bottom.

Figure 18A:
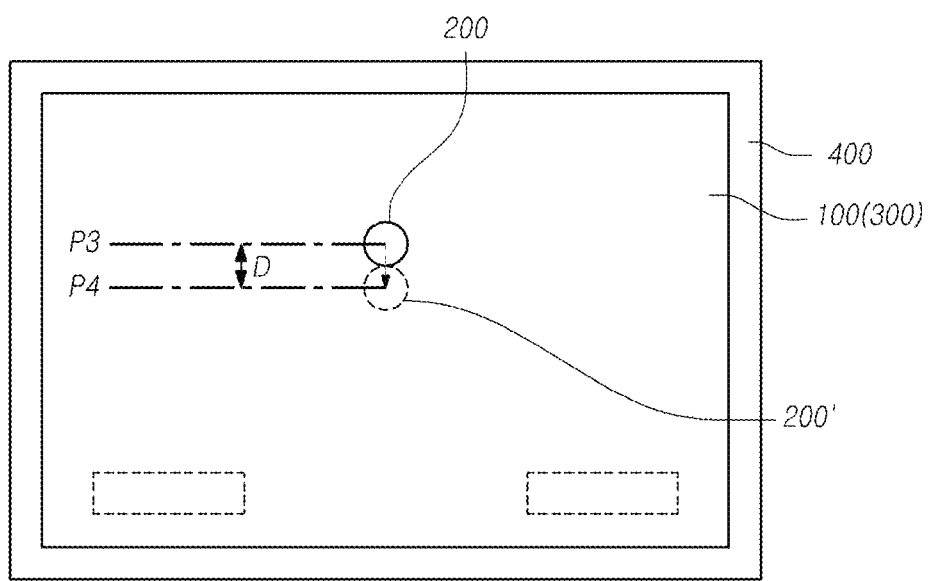
FIGS. 18A and 18B illustrate an embodiment, which further includes a sound compensation member in order to maintain the sound output characteristics when the sound generating actuator has been vertically moved.
Figure 18B:
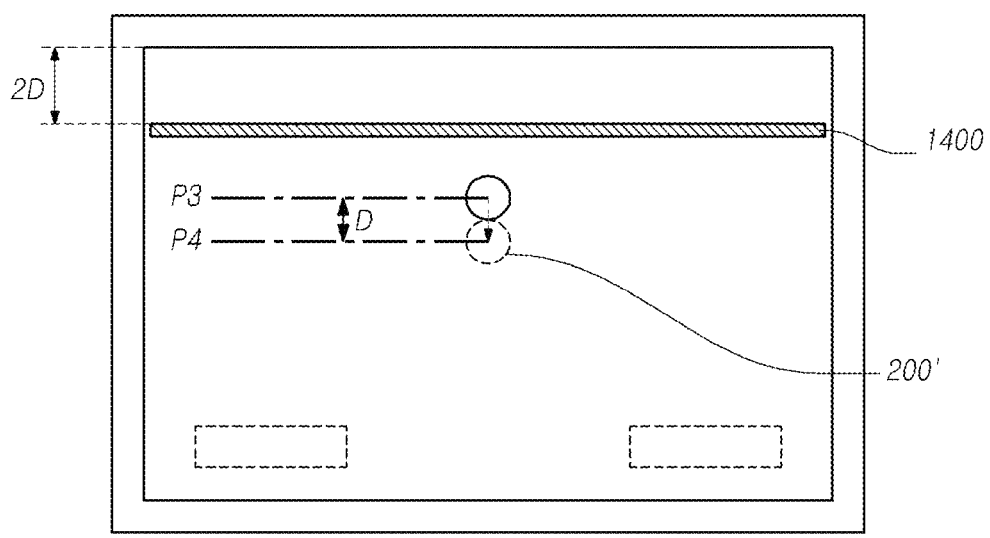

FIGS. 18A and 18B illustrate an embodiment, which further includes a sound compensation member in order to maintain the sound output characteristics when the sound generating actuator has been vertically moved by a reason of design.

FIG. 18A illustrates a state in which a sound generating actuator 200 is disposed at an initial position P3 having an optimal sound output characteristic.

However, the sound generating actuator may have to be moved by a predetermined distance D from the initial position P3 in order to maintain a lower thickness of the upper end portion or by reasons relating to design or arrangement of parts.

In this case, only a simple movement of the sound generating actuator changes the relative position with respect to the baffle part 400 and may thus degrade the sound output characteristics.

Therefore, in such a case, if the sound generating actuator is moved to a destination position P4 spaced a movement distance D apart from the initial position P3, a lengthy sound compensation member 1400 is preferably placed at a position spaced 2D apart from an edge (side) opposite to the moving direction.

That is, as shown in FIG. 18B, when the sound generating actuator is moved downward to a position P4 spaced apart by D from the initial position P3 by a reason relating to design, a sound compensation member 1400 extending along the length of the horizontal direction is placed at a position spaced apart by 2D from the upper edge of the display panel. The arrangement of a sound compensation member at a position corresponding to twice that of the moving distance D of the sound generating actuator enables the moved actuator to be located in the middle of the changed air gap by the sound compensation member, thereby minimizing the change in the sound generation characteristics according to the movement of the actuator.

The sound compensation member 1400 may be implemented by a double-sided tape disposed between the cover bottom and the display panel.

As described above, when it is necessary to change the position of a sound generating actuator, a sound compensation member may be placed at a position proportional to the moving distance, to maintain the relative position of the actuator in the entire air gap, thereby preventing the sound characteristics from changing according to the movement of the actuator.

Figure 19:
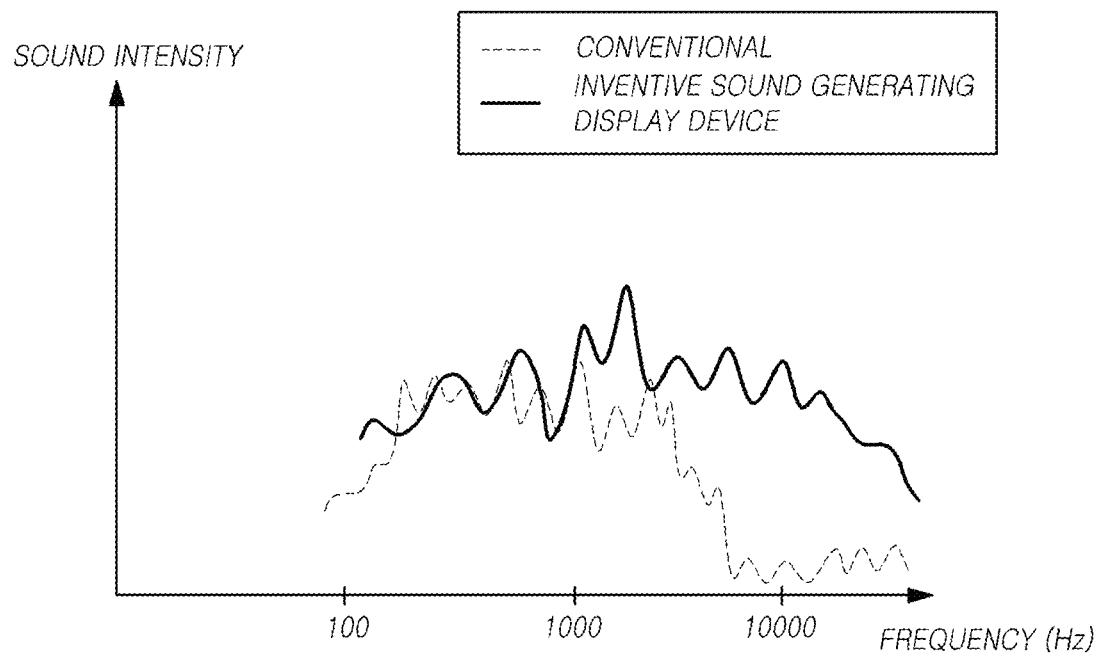
FIG. 19 is a graph illustrating a sound output characteristic when a panel vibration type sound generating apparatus according to the present embodiment is used, in comparison with a conventional speaker.

FIG. 19 is a graph illustrating a sound output characteristic in the case of using a panel vibration type sound generating apparatus according to an embodiment of the present disclosure, in comparison with a conventional speaker.

As a result of an actual experiment, a rapid sound intensity reduction (sound pressure reduction) as illustrated by a dotted line in FIG. 19 was observed in the middle/high sound range of 4000 Hz or higher when a speaker disposed at the rear surface or the lower end as shown in FIG. 1 separately from the display panel.

In contrast, as illustrated by a solid line in FIG. 19, the structure according to this embodiment, in which a sound generating actuator is fixed to a support structure to directly vibrate the display panel, can reduce the sound pressure in the middle/high sound range, and especially can greatly improve the sound output characteristic in the high sound range.

As a result, use of the present embodiment can provide rich sound output in all sound ranges.

According to the present embodiment as described above, one or more sound generating actuators are fixed to a support structure to directly vibrate the display panel. Therefore, the progressing direction of the sound coincides with the image output direction to enhance the sound localization and improve the sound output characteristics in a wide sound range.

Further, since a display device or a set apparatus does not require a separate speaker, the mechanism of the set apparatus can be easily designed and the thickness of the display device or set apparatus can be reduced.

Especially, a predetermined air gap is formed between the display panel and the sound generating actuator and the sound generating actuator is inserted in and fixed to a support hole formed at a support structure of the display device. Therefore, the display device has an excellent sound generation performance while having a reduced thickness.

Further, a baffle part, which includes an adhesive member (double-sided tape) attached between the upper surface of the support structure and the lower surface of the display panel and a sealing part disposed outside the adhesive member, can minimize sound leakage and improve the sound generating performance.

Further, the arrangement of one or more buffer members between a source PCB of the display panel and the support structure disposed at the rear surface of the display panel to fix/support the sound generating actuator or between the inner surface of the support structure and the rear surface of the display panel adjacent to the source PCB can prevent generation of interference and noise between the support structure of the display device and a source PCB (S-PCB) for driving the display panel.

Also, the arrangement of a reinforcement member on the support structure of the display device when two or more sound generating actuators are used can prevent deformation of the support structure due to different vibrations of the two or more sound generating actuators.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus, comprising:
a vibrating plate;
at least one sound generating actuator disposed at a rear of the vibrating plate and configured to vibrate the vibrating plate to generate sound;
a support structure on a rear surface of the vibrating plate;
a printed circuit at the rear of the vibrating plate; and
an area division member at a rear portion of the vibrating plate, the area division member dividing an area at the rear portion of the vibrating plate into a first area including the printed circuit and a second area including the at least one sound generating actuator.

2. The apparatus of claim 1, further comprising a baffle part disposed between the support structure and the vibrating plate to form an air gap between the support structure and the vibrating plate.

3. The apparatus of claim 2, wherein the baffle part is disposed at a periphery of the second area between the support structure and the vibrating plate to surround the air gap in the second area.

4. The apparatus of claim 2, wherein the vibrating plate is configured to generate sound waves in the air gap when vibrated by the at least two sound generating actuators, and
wherein the baffle part surrounds the air gap to reduce leakage of the sound waves out of the air gap.

5. The apparatus of claim 2, wherein the baffle part comprises at least one of an adhesive member and a sealing part disposed outside of the adhesive member.

6. The apparatus of claim 1,
wherein the at least one sound generating actuator includes at least two sound generating actuators, and
wherein the apparatus further comprises a reinforcement member extending between a sound generating actuator and another sound generating actuator among the at least two sound generating actuators.

7. The apparatus of claim 6, wherein the reinforcement member is disposed apart from the sound generating actuator and the other sound generating actuator.

8. The apparatus of claim 1, wherein the support structure comprises:
a cover bottom covering the rear portion of the vibrating plate; and
a middle cabinet supporting a periphery of the vibrating plate.

9. The apparatus of claim 1, wherein the support structure comprises:
a recessed part disposed in an inner surface of the support structure, the recessed part being disposed opposite the printed circuit; and
a first buffer member in the recessed part between the support structure and the printed circuit.

10. The apparatus of claim 1,
wherein the at least one sound generating actuator includes at least two sound generating actuators respectively disposed at different areas of the vibrating plate and respectively configured to vibrate the different areas of the vibrating plate to generate sound, and
wherein each of the at least two sound generating actuators is configured to vibrate the vibrating plate to generate sound projecting in a direction coinciding with an image output direction of the vibrating plate to localize the output sound.

11. The apparatus of claim 10, further comprising a baffle part at a rear portion of the vibrating plate separating one of the different areas from another of the different areas.

12. The apparatus of claim 10, wherein the at least two sound generating actuators are configured to generate a stereo sound.

13. The apparatus of claim 10, wherein the at least two sound generating actuators are symmetrically arranged.

14. The apparatus of claim 10, wherein the at least two sound generating actuators are configured to generate different vibrations from one another to generate different sounds in the different areas of the vibrating plate.

15. The apparatus of claim 1, wherein the thickness of the air gap is from about 1.0 mm to 3.0 mm.

16. The apparatus of claim 1, further comprising a sound compensation member.

* * * * *